United States Patent
Maki et al.

(10) Patent No.: US 7,673,106 B2
(45) Date of Patent: Mar. 2, 2010

(54) COMPUTER SYSTEM, MANAGEMENT METHOD AND STORAGE NETWORK SYSTEM

(75) Inventors: Nobuhiro Maki, Yokohama (JP);
Katsuhisa Miyata, Yokohama (JP);
Masamitsu Takahashi, Chigasaki (JP);
Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 657 days.

(21) Appl. No.: 11/174,673

(22) Filed: Jul. 6, 2005

(65) Prior Publication Data
US 2006/0101217 A1    May 11, 2006

(30) Foreign Application Priority Data
Nov. 11, 2004    (JP)    ............ 2004-327758

(51) Int. Cl.
*G06F 12/00* (2006.01)
(52) U.S. Cl. ........................................ 711/162
(58) Field of Classification Search ............. None
See application file for complete search history.

(56) References Cited

U.S. PATENT DOCUMENTS

| 5,937,414 A * | 8/1999 | Souder et al. ............... 707/203 |
| 6,681,303 B1 | 1/2004 | Watanabe et al. |
| 2001/0018692 A1 | 8/2001 | Suginoshita et al. |
| 2003/0051111 A1 | 3/2003 | Nakano et al. |
| 2004/0044649 A1 | 3/2004 | Yamato et al. |

FOREIGN PATENT DOCUMENTS

| JP | 2001-175681 | 6/2001 |
| JP | 2003-122509 | 4/2003 |
| JP | 2004-086721 | 3/2004 |
| JP | 2004-185644 | 7/2004 |

* cited by examiner

*Primary Examiner*—Reginald G Bragdon
*Assistant Examiner*—Eric Loonan
(74) *Attorney, Agent, or Firm*—Antonelli, Terry, Stout & Kraus, LLP.

(57) ABSTRACT

A storage network system that can be kept running despite a failure in a host computer is provided. A computer system includes: first, second and third storage systems which store data and are connected to one another; a primary host computer connected to the first storage system; a secondary host computer connected to the second storage system; and a management portion which manages data transfer between the storage systems, in which the management portion sets the storage systems such that, while the primary host computer is in operation, data stored in the first storage system is transferred to the second storage system and data stored in the second storage system is transferred to the third storage system, and wherein the management portion sets the storage systems such that, while the secondary host computer is in operation, data stored in the second storage system is transferred to the first storage system and data stored in the first storage system is transferred to the third storage system.

5 Claims, 31 Drawing Sheets

FIG.9

PAIR MANAGEMENT TABLE 2403

| COPY TYPE 24031 | PAIR NUMBER 24032 | PAIR STATE 24033 | PRIMARY SIDE SYSTEM ID 24034 | PRIMARY SIDE VOLUME ID 24035 | SECONDARY SIDE SYSTEM ID 24036 | SECONDARY SIDE VOLUME ID 24037 | COPY GROUP NUMBER 24038 |
|---|---|---|---|---|---|---|---|
| LOCAL COPY | 1 | NORMAL | STORAGE SYSTEM A | 1 | STORAGE SYSTEM A | 5 | NONE |
| ASYNCHRONOUS REMOTE COPY | 1 | NORMAL | STORAGE SYSTEM A | 2 | STORAGE SYSTEM B | 2 | 1 |
| ASYNCHRONOUS REMOTE COPY | 2 | NORMAL | STORAGE SYSTEM A | 3 | STORAGE SYSTEM B | 3 | 1 |
| NONE | 0 | NOT IN USE | 0 | 0 | 0 | 0 | NONE |

| VOLUME ID 24011 | VOLUME STATE 24012 | CAPACITY 24013 | PAIR NUMBER 24014 | COPY TYPE 24015 | DISK DRIVE NUMBER 24016 | ASSIGNED-FROM-HEAD ADDRESS 24017 |
|---|---|---|---|---|---|---|
| 1 | PRIMARY | 3 | 1 | LOCAL COPY | 1 | 1 |
| 2 | NORMAL | 2 | 1 | ASYNCHRONOUS REMOTE COPY | 1 | 0 |
| 3 | NORMAL | 3 | 2 | ASYNCHRONOUS REMOTE COPY | 2 | 2 |
| 4 | NOT IN USE | 3 | NONE | NONE | 2 | 0 |
| 5 | SECONDARY | 3 | 1 | LOCAL COPY | 2 | 0 |

VOLUME MANAGEMENT TABLE 2401

| | 24041 | 24042 | 24043 | 24044 | 24045 | 24046 | 24047 |
|---|---|---|---|---|---|---|---|
| | PATH NUMBER | PATH STATE | PRIMARY SIDE SYSTEM I/O PORT NUMBER | SECONDARY SIDE SYSTEM ID | SECONDARY SIDE SYSTEM I/O PORT NUMBER | COPY TYPE | COPY GROUP NUMBER |
| | 1 | NORMAL | 1 | STORAGE SYSTEM B | 1 | SYNCHRONOUS REMOTE COPY | 1 |
| | 2 | NORMAL | 1 | STORAGE SYSTEM B | 1 | SYNCHRONOUS REMOTE COPY | 1 |
| | 3 | AVAILABLE | 3 | STORAGE SYSTEM B | 2 | 0 | 0 |
| | 4 | NO PATH | 4 | 0 | 0 | 0 | 0 |

PATH MANAGEMENT TABLE 2404

FIG.22

| OPERATION CODE 12012 | SPECIFICS 12015 | OPERATION CODE 12012 | SPECIFICS 12015 |
|---|---|---|---|
| MAKE | COPY PROCESSING START INSTRUCTION | QUERY | CHECK COPY STATE |
| SUSPEND | SUSPENSION INSTRUCTION | BLDPTH | CREATE LOGICAL PATH |
| RESYNC | RESUMPTION INSTRUCTION | DELPTH | DELETE LOGICAL PATH |
| DELETE | COPY PROCESSING CANCELLATION INSTRUCTION | QRYPTH | CHECK LOGICAL PATH STATE |

COMPUTER SYSTEM, MANAGEMENT METHOD AND STORAGE NETWORK SYSTEM

CLAIM OF PRIORITY

The present application claims priority from Japanese application P2004-327758 filed on Nov. 11, 2004, the content of which is hereby incorporated by reference into this application.

BACKGROUND

This invention relates to a computer system, or storage network system, that can be run despite a failure in a host computer.

Some storage systems have host computers and storage on plural sites so that the extent of failure from a disaster is limited as much as possible and the business can be resumed quickly.

Large-scale natural disasters, terrorist attacks and the like can cause a serious damage to the building or even the entire city where a site of a storage system is located (regional disaster). In anticipation for such disasters, host computers of a storage system are set up across long distances and, when a failure occurs in one of the host computers, running of the system is handed over to another site.

In an example of such systems, two data centers on neighboring sites are connected to each other by a synchronous transfer copy function. One of the two data centers is connected to a third data center on a remote site by an asynchronous remote copy function, and the third data center holds data of a storage subsystem on the near site while keeping the order in which the storage subsystem has received the data from a host computer. Another example is a wide-area data storage system which gives each storage subsystem a function of tracking the progress of data transfer, reception and update between storage subsystems of two data centers where, in normal running of the storage system, direct data transfer does not take place (see JP 2001-175681 A).

A case is considered a case where a regional disaster causes a failure in the operating data center of a storage system of related art. The running of the storage system is switched over from the former operating data center to a remote data center. The switching over is called fail over.

SUMMARY

In the related art described above, fail over for switching over the running of the system takes place not only upon regional disasters but also in the event of a failure confined within a host computer on a data center, for example a hardware failure of a host computer that shuts down the host computer.

After fail over, the host computer on the remote site starts running the system. This contains the risk of data loss since data is copied to the remote data center by asynchronous remote copy, and thus lowers the reliability of the data.

It is therefore an object to provide a computer system including: first, second and third storage systems which store data and are connected to one another; a primary host computer connected to the first storage system; a secondary host computer connected to the second storage system; and a management portion which manages data transfer between the storage systems, wherein the management portion sets the storage systems such that, while the primary host computer is in operation, data stored in the first storage system is transferred to the second storage system and data stored in the second storage system is transferred to the third storage system, and wherein the management portion sets the storage systems such that, while the secondary host computer is in operation, data stored in the second storage system is transferred to the first storage system and data stored in the first storage system is transferred to the third storage system.

A service is kept provided without interruption and data loss is prevented despite a failure by changing a route and a transfer group which have been set between storage systems at the time of the failure to new ones.

BRIEF DESCRIPTION OF THE DRAWINGS

FIG. 9 is an explanatory diagram of an example of a pair management table 2403 according to the embodiment of this invention.

FIG. 10 is an explanatory diagram of an example of a volume management table 2401 according to the embodiment of this invention.

FIG. 11 is an explanatory diagram of an example of a path management table 2404 according to the embodiment of this invention.

FIG. 22 is an explanatory diagram showing an operation code 12012 according to the embodiment of this invention.

DETAILED DESCRIPTION OF THE PREFERRED EMBODIMENT

An embodiment of this invention will be described below in detail with reference to the accompanying drawings.

Figure 1:
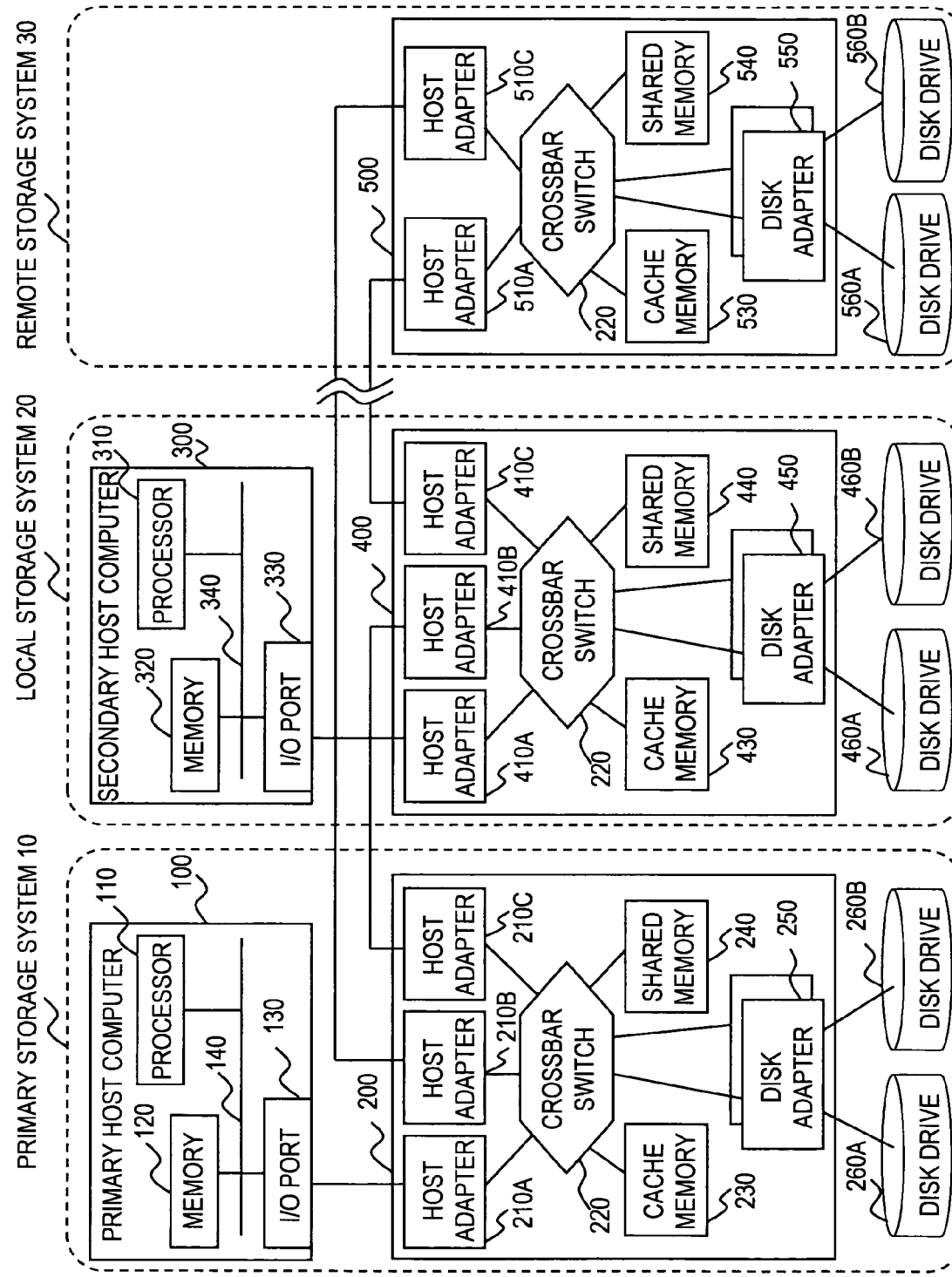
FIG. 1 is a block diagram of a storage network system according to an embodiment of this invention.

FIG. 1 is a block diagram of a storage network system.

The storage network system of this embodiment comprises three sites, a primary storage system 10, a local storage system 20 and a remote storage system 30.

The primary storage system 10 and the local storage system 20 are set up on neighboring sites. The remote storage system 30 is set up on a site remote from the primary storage system 10 and the local storage system 20.

The primary storage system 10 comprises a primary host computer 100, a primary storage control unit 200, and disk drives 260A and 260B.

The primary host computer 100 is a computer that sends a request to the primary storage control unit 200 and performs various computing processing upon reception of an answer to the request.

The primary host computer 100 comprises a processor 110, a memory 120 and an I/O port 130. Those components are connected to one another by a communication bus 140.

The processor 110 reads and executes a program or the like stored in the memory 120, to thereby control processing of the primary host computer 100. The I/O port 130 exchanges data with the primary storage control unit 200.

The primary storage control unit 200 comprises host adapters (210A, 210B and 210C), a crossbar switch 220, a cache memory 230, a shared memory 240 and disk adapters 250.

Each of the host adapters 210 is connected, by a communication channel, to the primary host computer 100 or to one of other storage control units (a local storage control unit 400 and a remote storage control unit 500) to send and receive data. In this embodiment, the host adapter 210A is connected to the primary host computer 100, the host adapter 210B is connected to the remote storage control unit 500, and the host adapter 210C is connected to the local storage control unit 400.

The crossbar switch 220 transfers data sent and received between the components of the primary storage control unit 200.

The cache memory 230 temporarily stores data read out of and written in the disk drives 260.

The shared memory 240 stores information on the configuration of the primary storage control unit 200.

The disk adapters 250 (250A and 250B) exchange data with the disk drives 260. The two disk adapters provide a redundant configuration. The disk adapters 250A and 250B send and receive data following such a protocol as SCSI or Fibre Channel.

Figure 5:
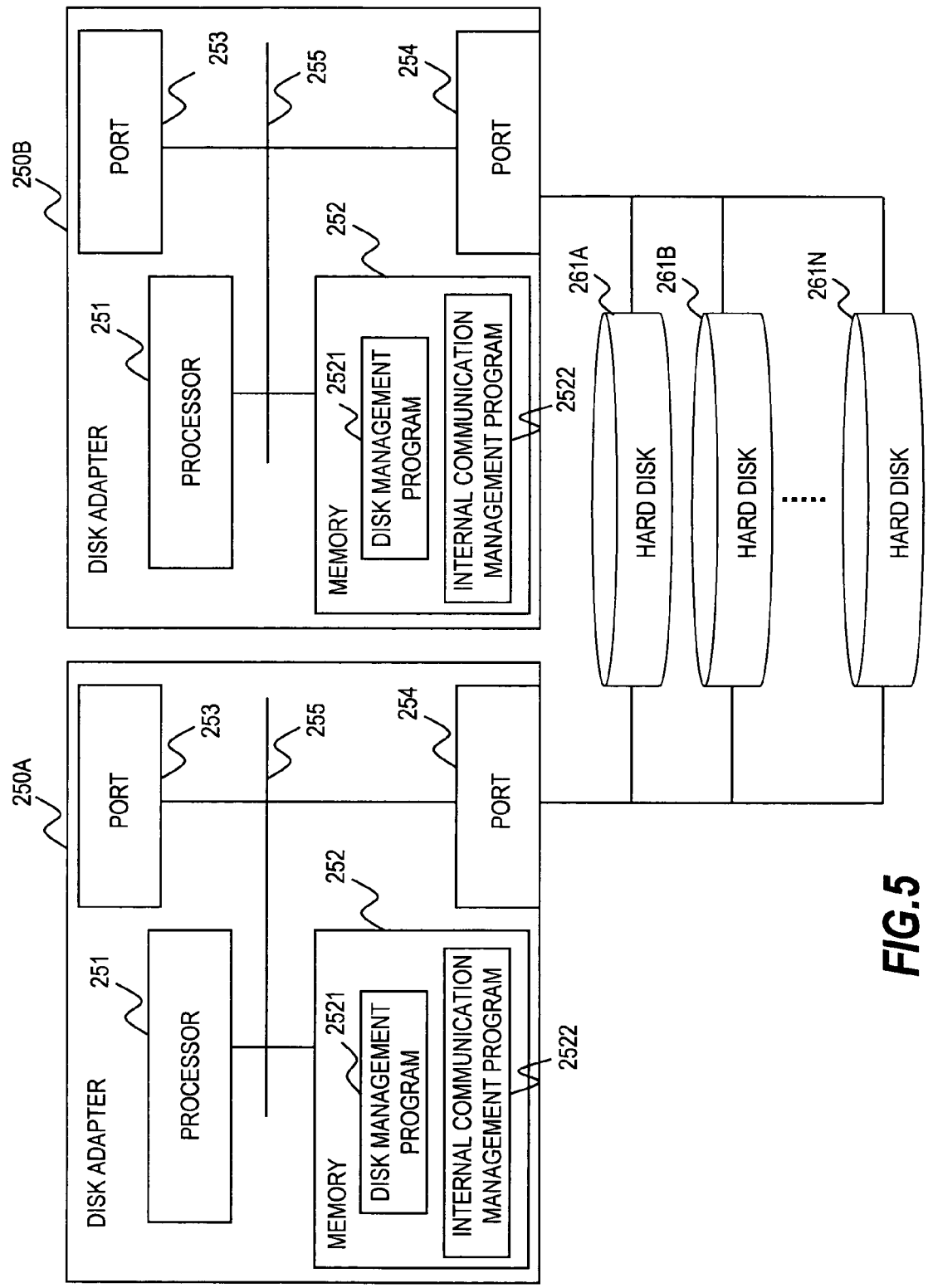
FIG. 5 is a block diagram of disk adapters 250 and disk drives 260 according to the embodiment of this invention.

The disk drives 260A and 260B store data. As shown in FIG. 5, the disk drives 260A and 260B are not two physical devices but are plural hard disks constituting logical disk drives in a RAID configuration or the like. The logical disk drives are shown in the drawings as the disk drives 260A and 260B. Plural logical volumes can be set in the disk drives 260A and 260B.

The local storage system 20 comprises a secondary host computer 300, the local storage control unit 400, and disk drives 460A and 460B.

The secondary host computer 300 comprises a processor 310, a memory 320 and an I/O port 330. Those components are connected to one another by a communication bus 340.

The local storage control unit 400 comprises host adapters (410A, 410B and 410C), a crossbar switch 420, a cache memory 430, a shared memory 440 and disk adapters 450.

In this embodiment, the host adapter 410A is connected to the secondary host computer 300, the host adapter 410B is connected to the primary storage control unit 200, and the host adapter 410C is connected to the remote storage control unit 500.

The secondary host computer 300 has the same configuration as the primary host computer 100 of the primary storage system 10 described above. The local storage control unit 400 and the disk drives 460A and 460B are respectively configured the same way the primary storage control unit 200 and the disk drives 260A and 260B are built in the primary storage system 10 described above.

The remote storage system 30 comprises the remote storage control unit 500 and disk drives 560. The remote storage system 30 has no host computer. Needless to say, the remote system 30 can also have host computer.

The remote storage control unit 500 comprises host adapters (510A and 510B), a crossbar switch 520, a cache memory 530, a shared memory 540 and disk adapters 550.

In this embodiment, the host adapter 510A is connected to the primary host computer 100 and the host adapter 510B is connected to the local storage control unit 400.

Figure 2:
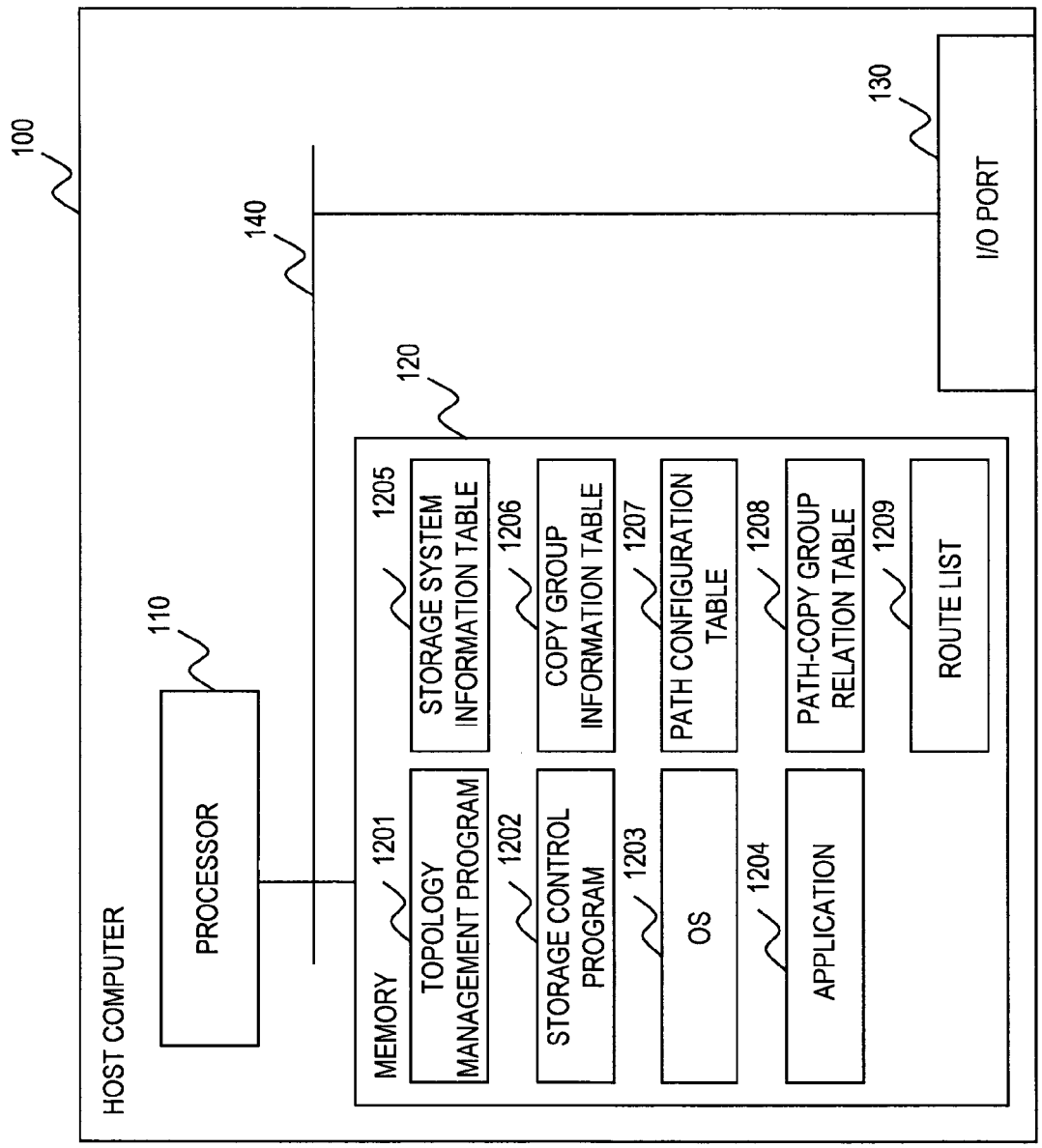
FIG. 2 is a block diagram of a primary host computer 100 according to the embodiment of this invention.

FIG. 2 is a block diagram of the primary host computer 100.

As described above, the primary host computer 100 comprises the processor 110, the memory 120 and the I/O port 130. Those components are connected to one another by the communication bus 140.

The memory 120 stores a topology control program 1201, a storage control program 1202, an OS 1203 and an application 1204, which are recorded in advance in a recording medium (e.g., hard disk) and read out of the recording medium to be stored in the memory 120.

The memory 120 also stores a storage system information table 1205, a copy group information table 1206, a path configuration table 1207, a path-copy group relation table 1208 and a route list 1209.

The OS 1203 is basic software to control each component of the primary host computer 100, and is executed by the processor 110.

The topology control program 1201 is executed by the processor 110 to manage the logical configuration (topology) of the storage network system.

The storage control program 1202 is executed by the processor 110 to instruct the primary storage control unit 200 to read and write data. The storage control program 1202 also functions as a management module to manage paths, copy pairs and copy groups of the primary storage control unit 200, the local storage control unit 400 and the remote storage control unit 500.

The application 1204 is executed by the processor 110 to execute a service that is provided by the storage network system.

The storage system information table 1205 holds identifiers of storage control units and identifiers of logical volumes.

The copy group information table 1206 holds information of copy groups set.

The path configuration table 1207 holds definition configuration information of paths set.

The path-copy group relation table 1208 holds the relation between a path and a copy group.

The route list 1209 holds information of routes connecting the primary storage control unit 200 to the other storage control units (the local storage control unit 400 and the remote storage control unit 500).

Figure 3:
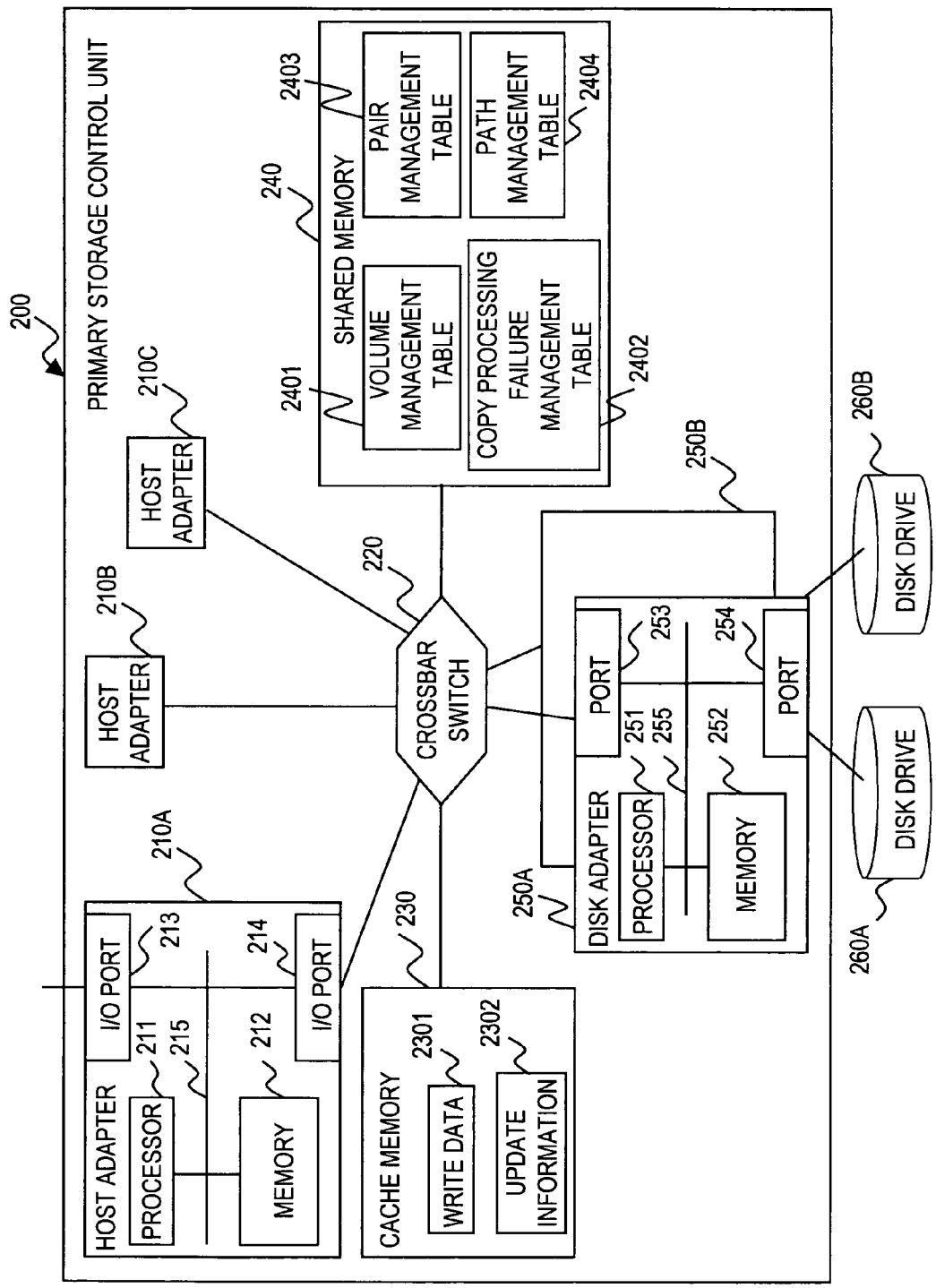
FIG. 3 is a block diagram of a primary storage control unit 200 according to the embodiment of this invention.

FIG. 3 is a block diagram of the primary storage control unit 200.

As described above, the primary storage control unit 200 comprises the host adapters (210A, 210B and 210C), the crossbar switch 220, the cache memory 230, the shared memory 240, and the disk adapters 250A and 250B. Those components are connected to one another by the crossbar switch 220.

The cache memory 230 stores write data 2301 and update information 2302. The write data 2301 is data concerning requests. The update information 2302 is information of data newly stored in the cache memory 230.

The shared memory 240 stores a volume management table 2401, a copy processing failure management table 2402, a pair management table 2403 and a path management table 2404.

The volume management table 2401 holds information of logical volumes set in the disk drives 260A and 260B.

The copy processing failure management table 2402 holds information of a failure that occurs during data copy between volumes.

The pair management table 2403 holds information of copy pairs set in the logical volumes.

The path management table 2404 holds information of paths defined between the storage systems (the primary storage system 10, the local storage system 20 and the remote storage system 30).

Figure 4:
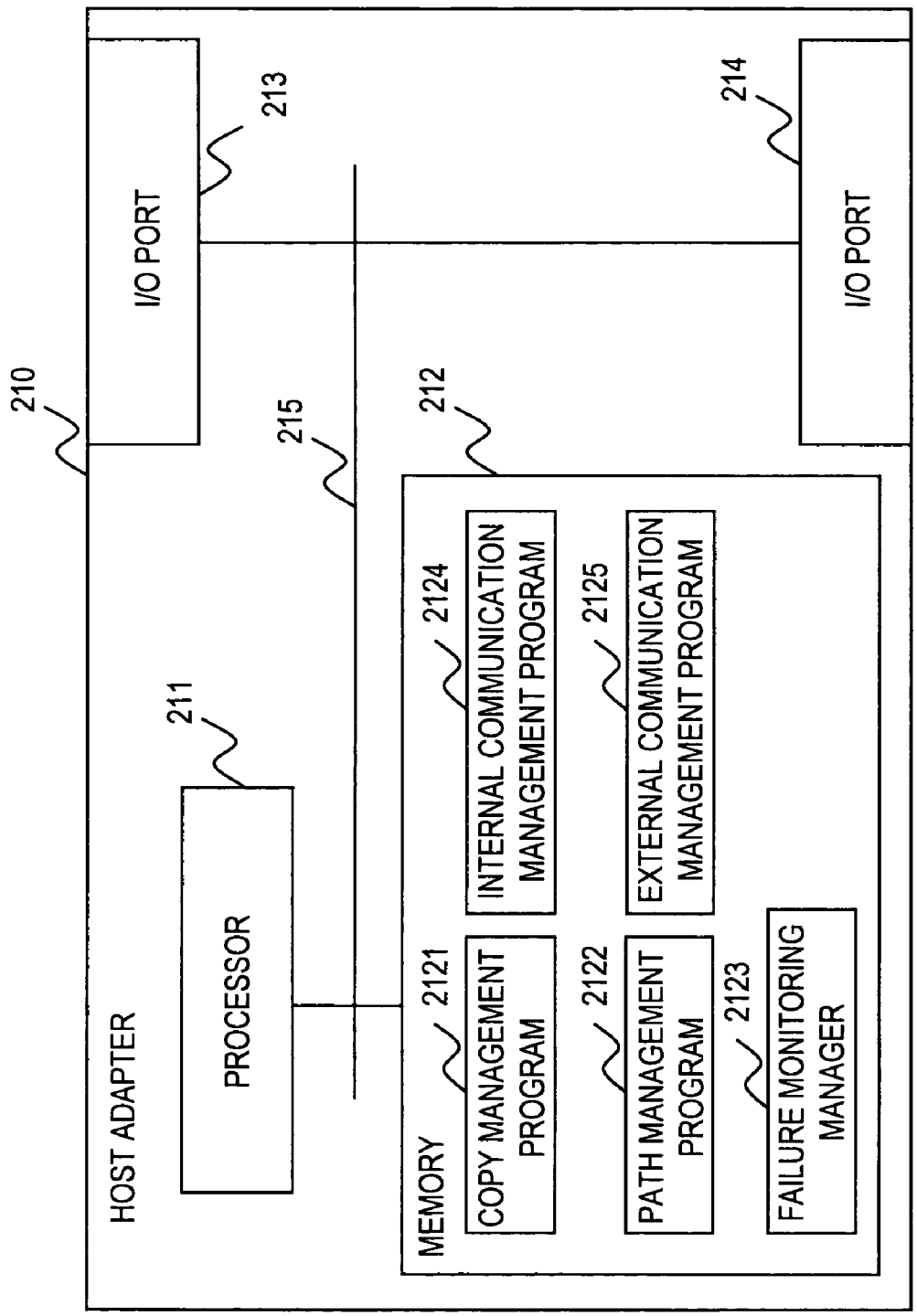
FIG. 4 is a block diagram of host adapters 210 according to the embodiment of this invention.

FIG. 4 is a block diagram of the host adapters 210.

The host adapters 210 each comprise a processor 211, a memory 212, an I/O port 213 and an I/O port 214. Those components are connected to one another by a communication bus 215.

The processor 211 reads and executes programs stored in the memory 212, to thereby execute processing of the host adapters 210.

The memory 212 stores a copy management program 2121, a path management program 2122, a failure monitoring manager 2123, an internal communication management program 2124 and an external communication management program 2125.

The copy management program 2121 is executed by the processor 211 to control data copy of logical volumes.

The path management program 2122 is executed by the processor 211 to control paths defined between the storage systems (the primary storage system 10, the local storage system 20 and the remote storage system 30).

The failure monitoring manager 2123 is executed by the processor 211 to monitor whether there is a failure in the primary host computer 100 or not.

The internal communication management program 2124 is executed by the processor 211 to control communications inside the primary storage control unit 200, namely, internal communications via the crossbar switch 220 between the rest of the components of the primary storage control unit 200.

The external communication management program 2125 is executed by the processor 211 to control communications with the outside of the primary storage control unit 200, namely, external communications with the primary host computer 100 or with the other storage control units (the local storage control unit 400 and the remote storage control unit 500).

The I/O port 213 exchanges data with the primary host computer 100 connected to the primary storage control unit 200 or with the other storage control units (the local storage control unit 400 and the remote storage control unit 500).

The I/O port 214 exchanges data, via the crossbar switch 220, with the rest of the components of the primary storage control unit 200.

FIG. 5 is a block diagram of the disk adapters 250 and the disk drives 260.

The disk adapters 250 of this embodiment include two disk adapters 250A and 250B to have a redundant configuration. The disk drives 260A and 260B are constituted of plural hard disks (261A to 261N). The plural hard disks (261A to 261N) constitute the logical disk drives 260A and 260B in a RAID configuration or the like. Plural logical volumes can be set in the disk drives 260A and 260B.

The disk adapters 250 each comprise a processor 251, a memory 252, a port 253 and an I/O port 254. Those components are connected to one another by a communication bus 255.

The processor 251 reads and executes programs or the like stored in the memory 252 to control processing of the host adapters 210.

The memory 252 stores a disk management program 2521 and an internal communication management program 2522.

The disk management program 2521 is executed by the processor 251 to control data read/write in the hard disks 261.

The internal communication management program 2522 is executed by the processor 251 to control communications inside the primary storage control unit 200, namely, internal communications via the crossbar switch 220 between the rest of the components of the primary storage control unit 200.

The port 253 exchanges data, via the crossbar switch 220, with the rest of the components of the primary storage control unit 200.

The port 254 exchanges data with the hard disks 261 following such a protocol as SCSI or Fibre Channel.

Now, a description will be given with reference to FIG. 1 on how the storage network system of this embodiment operates.

The storage network system of this embodiment comprises the primary storage system 10, the local storage system 20 and the remote storage system 30. The relation between the systems 10, 20 and 30 will be described first.

While the storage network system is running, the primary storage system 10 and the local storage system 20 are synchronized with each other whereas the local storage system 20 and the remote storage system 30 are asynchronous with each other.

The primary host computer 100 issues an I/O instruction to the primary storage control unit 200. The primary storage control unit 200 analyzes the received I/O instruction and processes accordingly.

When the I/O instruction is a write request, the primary storage control unit 200 writes data requested by the write request in the disk drives 260. At this point, synchronous remote copy is executed to write this data in the local storage control unit 400 of the local storage system 20 which is in sync with the primary storage control unit 200.

In synchronous remote copy, when data is written upon a write request in logical volumes of the disk drives 260 of the primary storage system 10, the requested data is transferred to logical volumes of the disk drives 460 of the local storage system 20. The local storage control unit 400 notifies the primary storage control unit 200 of completion of processing to write the transferred data. Then the primary storage control unit 200 notifies the primary host computer 100, which has issued the I/O instruction, of completion of the I/O instruction.

Thus, when in sync with each other, the primary storage system 10 and the local storage system 20 always have the same data in logical volumes of the disk drives 260 and in logical volumes of the disk drives 460, respectively. This enables the storage network system to continue its business when there is a failure in one of the primary storage system 10 and the local storage system 20 since data kept in logical volumes of either the disk drives 260 or the disk drives 460 remains available.

The local storage control unit 400 of the local storage system 20 receives an I/O instruction from the primary host computer 100 via the primary storage control unit 200. When the I/O instruction is a write request, asynchronous remote copy is executed to write requested data in the remote storage control unit 500 of the remote storage system 30 which is asynchronous with the local storage control unit 400.

In asynchronous remote copy, after data is written upon a write request in logical volumes of the disk drives 460 of the local storage system 20, the requested data is transferred to the remote storage control unit 500 of the remote storage system 30 at an arbitrary timing. The local storage control unit 400 notifies the primary host computer 100, which has issued the I/O instruction, of completion of the I/O instruction without waiting for the remote storage control unit 500 to notify of completion of processing to write the transferred data.

Therefore, at the time when the local storage system 20 notifies the primary host computer 100 of completion of processing to write the data, copy of the data to logical volumes of the disk drives 560 of the remote storage system 30 may not have been completed. Thus logical volumes in the disk drives 460 of the local storage system 20 and logical volumes in the disk drives 560 of the remote storage system 30 do not always have the same data.

In asynchronous remote copy, a storage system from which data is copied sends a response to its upper storage system without waiting for a response from a storage system to which the data is copied. This enables the storage network system to transfer data in logical volumes of one storage system to another without delaying processing of a host computer irrespective of whether the band width between the storage systems is wide enough or not.

Described next is processing executed when an I/O instruction is issued from the primary host computer 100.

An I/O instruction issued from the primary host computer 100 is received by one of the host adapters 210 in the primary storage control unit 200.

The processor 211 of the one of the host adapters 210 that has received the I/O instruction stores the I/O instruction in the memory 212. Then the processor 211 analyzes the stored I/O instruction to obtain what is contained in the I/O instruction. When it is judged that the stored I/O instruction is not right, the processor 211 notifies the primary host computer 100, which has sent the I/O instruction, of the error.

When the obtained I/O instruction is identified as a copy control instruction, the processor 211 of the one of the host adapters 210 that has received the I/O instruction creates a copy start instruction based on the copy control instruction. The copy start instruction is stored in the shared memory 240 via the crossbar switch 220.

The processor 251 of each of the disk adapters 250 regularly searches the shared memory 240 for an instruction. Judging that a copy start instruction is stored in the shared memory 240, the processor 251 obtains the copy start instruction and starts copy processing of a logical volume based on the obtained copy start instruction. For instance, when the obtained copy start instruction is a synchronous remote copy start instruction, the processor 251 follows the synchronous remote copy start instruction and transfers data of a copy source logical volume to a copy destination logical volume in one of the disk drives 460 of the local storage control unit 400.

The processor 251 stores, in the shared memory 240, upon completion of processing based on the copy start instruction, a message saying that the copy start instruction has been completed.

The processor 211 of each of the host adapters 210 regularly searches the shared memory 240 for a message. Judging that a completion message is in the shared memory 240, the processor 211 obtains the message and notifies the primary host computer 100, which has issued the I/O instruction, of the completion.

When the obtained I/O instruction is identified as a write instruction, the processor 211 of the one of the host adapters 210 that has received the I/O instruction stores write data indicated by the write instruction in the cache memory 230 via the crossbar switch 220.

When write data is stored in the cache memory 230, the processor 251 of each of the disk adapters 250 writes the write data in logical volumes of the disk drives 260. The processor 251 stores, in the shared memory 240, upon completion of writing the write data, a message saying that the write instruction has been completed.

The processor 211 of each of the host adapters 210 regularly searches the shared memory 240 for a message. Judging that a completion message is in the shared memory 240, the processor 211 obtains the message and notifies the primary host computer 100, which has issued the I/O instruction, of the completion.

When the obtained I/O instruction is identified as a read instruction, the processor 211 of the one of the host adapters 210 that has received the I/O instruction creates a read start instruction based on the read instruction. The read start instruction is stored in the shared memory 240 via the crossbar switch 220.

The processor 251 of each of the disk adapters 250 regularly searches the shared memory 240 for an instruction. Judging that a read start instruction is stored in the shared memory 240, the processor 251 obtains the read start instruction and reads data out of a logical volume in one of the disk drives 260 that is designated by the obtained read start instruction. The processor 251 stores the read data in the cache memory 230. After every read data designated by the request is stored in the cache memory 230, the processor 251 stores in the shared memory 240 a message saying that the read start instruction has been completed.

The processor 211 of each of the host adapters 210 regularly searches the shared memory 240 for a completion message. Judging that the shared memory 240 has a message saying that a read start instruction has been completed, the processor 211 obtains the message and sends read data stored in the cache memory 230 to the primary host computer 100, which has sent the I/O instruction, in accordance with the message.

Remote copy will be described next.

As described above, a write instruction which is one of I/O instructions issued from the primary host computer 100 starts synchronous remote copy from the primary storage control unit 200 to the local storage control unit 400. A write instruction which is one of I/O instructions issued from the primary host computer 100 also starts asynchronous remote copy from the local storage control unit 400 to the remote storage control unit 500.

Figure 6:
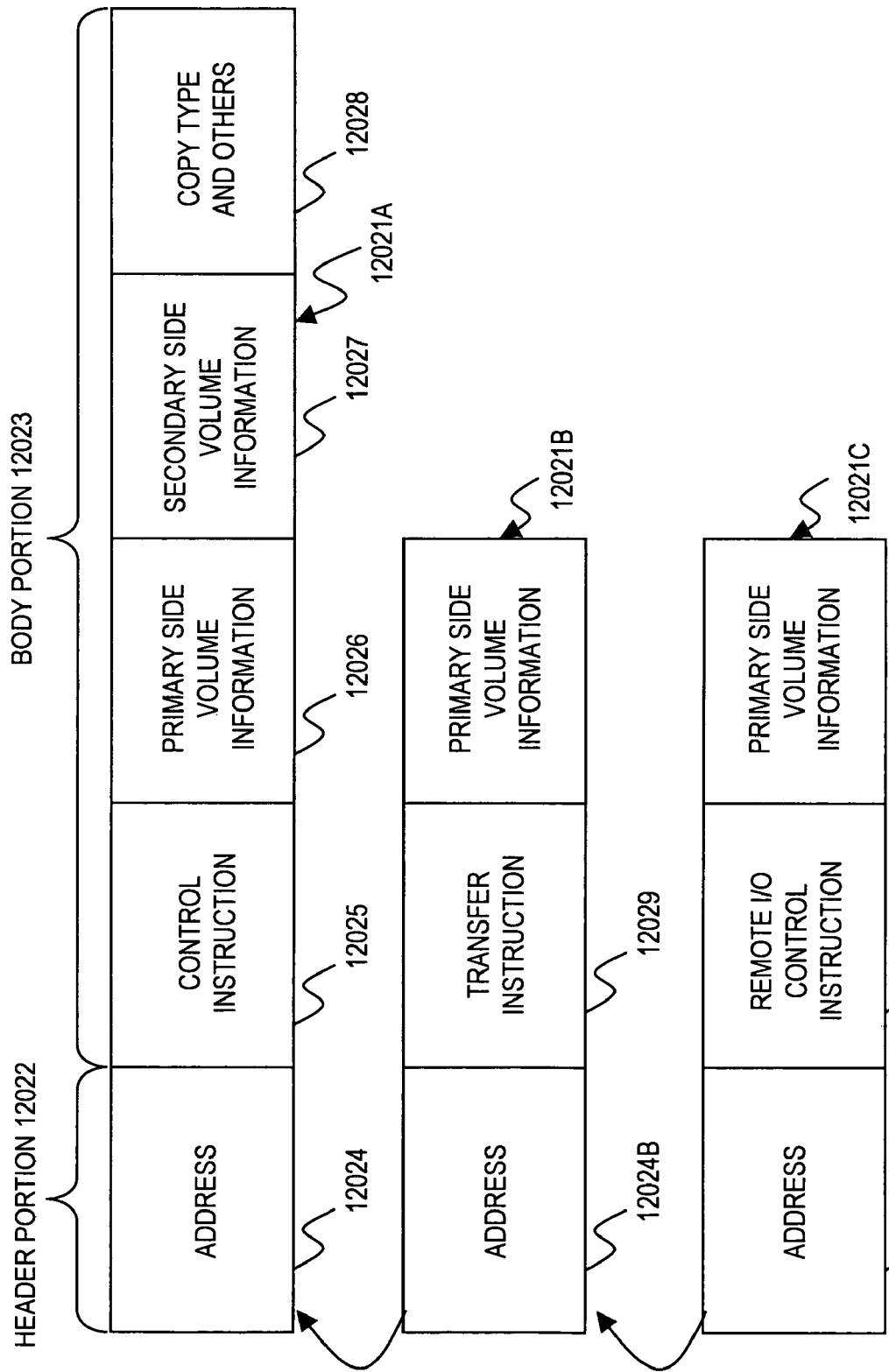
FIG. 6 is a block diagram of an I/O instruction issued from the primary host computer 100 according to the embodiment of this invention.

FIG. 6 is a block diagram of an I/O instruction issued from the primary host computer 100.

The storage control program 1202 of the primary host computer 100 creates a desired I/O instruction and sends the created instruction to a storage control unit to which the instruction is directed. The I/O instruction comprises a control I/O instruction 12021A, or of a command chain (a set of a control I/O instruction 12021A, a transfer I/O instruction 12021B and a remote I/O instruction 12021C).

The control I/O instruction 12021A comprises a header portion 12022 and a body portion 12023.

The header portion 12022 contains an address 12024 to where the I/O instruction is directed. For instance, an identifier indicating a storage control unit is contained as the address 12024.

The body portion 12023 contains a control instruction 12025, primary side volume information 12026, secondary side volume information 12027 and a type 12028.

Contained as the control instruction 12025 is an instruction to be controlled by this I/O instruction. For instance, an instruction to set a volume copy, a path or the like is contained as the control instruction 12025.

Contained as the primary side volume information 12026 is information of a logical volume to be controlled by the I/O instruction. For instance, when the I/O instruction is a copy instruction, information of a logical volume to which data is copied (the identifier of the storage control unit to which this volume belongs and the identifier of this volume) is contained as the primary side volume information 12026.

Contained as the secondary side volume information 12027 is information of a logical volume to be controlled by the I/O instruction. For instance, when the I/O instruction is a copy instruction, information of a logical volume to which data is copied (the identifier of the storage control unit to which this volume belongs and the identifier of this volume) is contained as the secondary side volume information 12027.

Contained as the type 12028 is the type of the instruction indicated by the control instruction 12025. Specifically, when the control instruction 12025 is a copy instruction, information indicating the type of the copy instruction (local copy, synchronous remote copy, asynchronous remote copy or the like) is contained as the type 12028.

The primary host computer 100 issues the created control I/O instruction 12021A as an I/O instruction to the host adapter 210A of the primary storage control unit 200.

Described next is a case where the primary host computer 100 issues an I/O instruction to the local storage control unit 400 of the local storage system 20 or to the remote storage control unit 500 of the remote storage system 30. In this case, the storage control program 1202 of the primary host computer 100 creates, in addition to the control I/O instruction 12021A, the transfer I/O instruction 12021B and the remote I/O instruction 12021C.

The created control I/O instruction 12021A, transfer I/O instruction 12021B and remote I/O instruction 12021C are grouped together as a command chain. The primary host computer 100 issues this command chain as an I/O instruction.

One of the host adapters 210 that has received the command chain analyzes the remote I/O instruction 12021C first. The remote I/O instruction 12021C contains a remote I/O control instruction 12030.

The processor 211 of the one of the host adapters 210 that has received the command chain detects the remote I/O control instruction 12030 within the remote I/O instruction 12021C, and thereby judges that this command chain is an I/O instruction directed to other storage control units. Then the processor 211 analyzes an address 12024C of the remote I/O instruction 12021C. Contained as the address 12024C is information on a link to the transfer I/O instruction 12021B.

Thereafter, the processor 211 of the one of the host adapters 210 that has received the command chain analyzes the transfer I/O instruction 12021B specified by the address link information of the address 12024C in the remote I/O instruction 12021C. The transfer I/O instruction 12021B contains a transfer instruction 12029. Contained as the transfer instruction 12029 is the identifier of the storage control unit (the local storage control unit 400 or the remote storage control unit 500) to which the I/O instruction is to be transferred. The transfer I/O instruction 12021B also contains an address 12024B, which is information on a link to the control I/O instruction 12021A.

The processor 211 of the one of the host adapters 210 that has received the command chain transfers, to the storage control unit designated by the transfer instruction 12029, the control I/O instruction 12021A specified by the address link information of the address 12024B in the transfer I/O instruction 12021B. The storage control unit that receives this I/O instruction processes in accordance with the received I/O instruction.

Copy control processing will be described next.

As described above, data stored in a logical volume is transferred as the primary host computer 100 issues an I/O instruction. For this processing, the primary host computer 100 defines a copy pair composed of a copy source logical volume and a copy destination logical volume. Once a copy pair is defined, data write in a copy source logical volume is accompanied by data transfer to its paired copy destination logical volume.

Figure 7:
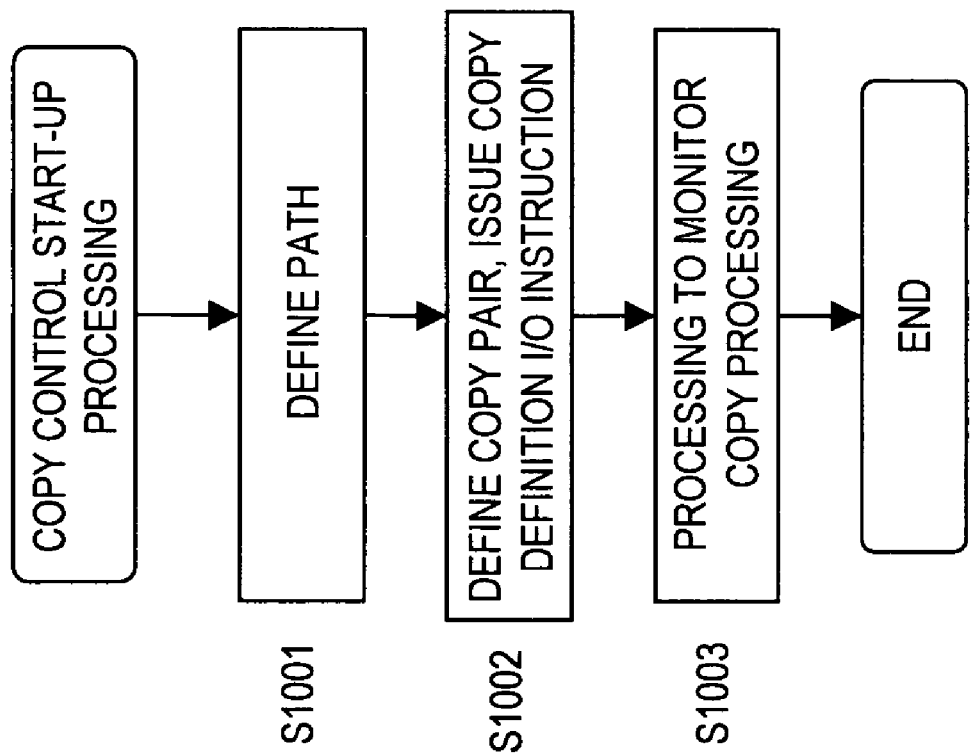
FIG. 7 is a flow chart of copy control start-up processing according to the embodiment of this invention.

FIG. 7 is a flow chart of copy control start-up processing, which is executed by the storage control program 1202 of the primary host computer 100.

The storage control program 1202 first defines a path (a step S1001).

Paths are classified into physical paths and logical paths. Routes that are physical communication channels between I/O ports of host adapters of different storage control units are called physical paths. Logical paths are the physical paths that are available to a program or the like. A logical path is established by establishing a session between host adapters where a physical path has been formed. In this embodiment, only logical paths will hereinafter be called as "paths".

The storage control program 1202 defines a path by defining the relation between the I/O port number of a host adapter of a primary side (copy source) storage control unit and the I/O port number of a host adapter of a secondary side (copy destination) storage control unit.

There is no need to define a path for data copy between logical volumes of disk drives in the same storage system.

The storage control program 1202 next defines a copy pair (a step S1002).

The storage control program 1202 defines a copy pair by defining the relation between a logical volume of a copy source disk drive (primary side volume) and a logical volume of a copy destination disk drive (secondary side volume) and by defining the type of the copy.

Once a copy pair is defined, the storage control program 1202 creates a copy definition I/O instruction, which contains a path definition and a copy pair definition, and issues the created instruction to the primary storage control unit 200. Receiving the copy definition I/O instruction, the host adapters 210 of the primary storage control unit 200 follows the copy definition I/O instruction to execute copy control registration processing of FIG. 8. The copy control registration processing establishes the defined path and enables the copy pair to copy data.

As the copy control registration processing is executed in the primary storage control unit 200, the storage control program 1202 monitors whether the copy processing is being executed properly or not (a step S1003). Specifically, the storage control program 1202 regularly issues I/O instructions to check the state of the copy processing to the primary storage control unit 200.

In the case where a failure occurs during the processing, the primary storage control unit 200 stores the specifics of the failure in the copy processing failure management table 2402 of the shared memory 240. Receiving an I/O instruction to check the copy processing state, the primary storage control unit 200 consults the copy processing failure management table 2402. When a failure is found as a result, the primary host computer 100 is notified of the failure.

The description given next is about the copy control registration processing executed by the copy management program 2121 in each of the host adapters 210 of the primary storage control unit 200.

Figure 8:
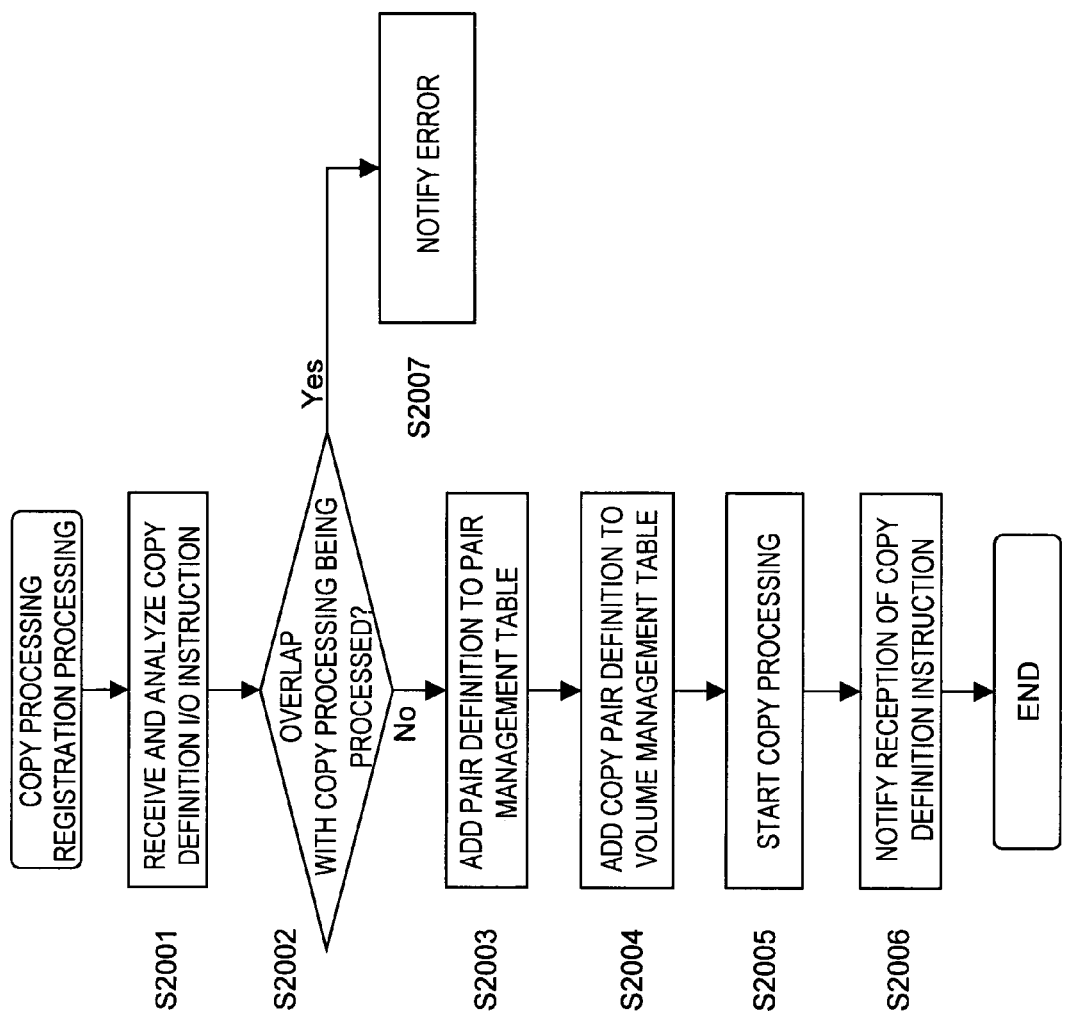
FIG. 8 is a flow chart of the copy control registration processing according to the embodiment of this invention.

FIG. 8 is a flow chart of the copy control registration processing.

This processing is executed by the copy management program 2121 when the host adapters 210 receive a copy definition I/O instruction issued from the primary host computer 100.

The copy management program 2121 first analyzes the received copy definition I/O instruction (a step S2001). The copy management program 2121 obtains a copy pair definition contained in the copy definition I/O instruction and obtains a path definition when it is contained in the copy definition I/O instruction.

Next, the copy management program 2121 judges whether or not a primary side volume or a secondary side volume for which copy processing has already been executed matches a primary side volume or a secondary side volume contained in the obtained copy pair definition (a step S2002).

When it is judged that a volume for which copy processing has already been executed is found in the copy pair definition, processing according to the copy definition I/O instruction cannot be executed, and the primary host computer 100 is notified of the error (a step S2007).

On the other hand, when it is judged that a volume for which copy processing has already been executed is not found in the copy pair definition, the path definition obtained in the step S2001 is added as a new entry to the path management table 2404 shown in FIG. 11 (a step S2003).

Detecting a new entry, the path management program 2122 obtains the path definition of the new entry to establish a session between I/O ports indicated by the definition. The path is thus established.

The copy management program 2121 next adds the copy pair definition obtained in the step S2001 as a new entry to the pair management table 2403 shown in FIG. 10 (a step S2004).

Detecting a new entry, the copy management program 2121 obtains the copy pair definition of the new entry, and starts copy processing between a primary side volume and a secondary side volume that are indicated by the definition (a step S2005).

Specifically, the copy management program 2121 first stores a copy processing start instruction in the shared memory 240.

The processor 251 of each of the disk adapters 250 regularly searches the shared memory 240 for an instruction. Judging that a copy processing start instruction is stored in the shared memory 240, the processor 251 obtains the copy processing start instruction and starts initial copy processing based on the obtained instruction.

In the initial copy processing, data is read out of an area of a given capacity of a primary side volume that is specified in the obtained copy processing start instruction, and is stored in the cache memory 230. The initial copy processing is repeated until all areas of the primary side volume are read.

When the secondary side volume paired with the primary side volume is in a disk drive of the same storage control unit where the primary side volume is located, the processor 251 of one of the disk adapters 250 reads the data stored in the cache memory 230 and writes the data in the secondary side volume of the relevant one of the disk drives 260.

When the secondary side volume paired with the primary side volume is in a disk drive of another storage control unit, for example, in one of the disk drives 460 of the local storage control unit 400, the processor 211 of one of the host adapters 210 that is connected to the local storage control unit 400 obtains the copy processing start instruction stored in the shared memory 240 and reads the data stored in the cache memory 230 in accordance with the instruction. The processor 211 then issues an I/O instruction to write the read data in the secondary side volume of the relevant one of the disk drives 460 in the local storage control unit 400.

As the initial copy processing is started in the step S2004, the processor 211 of the relevant one of the host adapters 210 notifies the primary host computer 100, which has issued the copy definition I/O instruction, of reception of the copy definition I/O instruction (a step S2006).

Subsequently, write data is transferred from one logical volume to another of the defined copy pair. This copy processing is called steady copy processing.

FIG. 9 is an explanatory diagram of an example of the pair management table 2403 stored in the shared memory 240.

The pair management table 2403 holds entries of pair definitions defined by the primary host computer 100.

The pair management table 2403 comprises a copy type 24031, a pair number 24032, a pair state 24033, a primary side system ID 24034, a primary side volume ID 24035, a local side system ID 24036, a local side volume ID 24037 and a copy group number 24038.

The copy type 24031 indicates information on the type of a copy pair defined.

The pair number 24032 indicates the identifier of a copy pair defined, and is sorted by copy type.

The pair state 24033 indicates the current operation state of a copy pair. There are three different operation states: "normal" for signifying that a copy pair is in a normal state, "not in use" for signifying that no copy pair is defined, and "trouble" for signifying that something has gone wrong with copy pair processing. One of those three operation states is entered as the pair state 24033.

The primary side system ID 24034 indicates the identifier of a primary side (copy source) storage system.

The primary side volume ID 24035 indicates the identifier of a primary side (copy source) logical volume.

The secondary side system ID 24036 indicates the identifier of a secondary side (copy destination) storage system.

The secondary side volume ID 24037 indicates the identifier of a secondary side (copy destination) logical volume.

The copy group number 24038 indicates, when a copy pair belongs to a copy group, the identifier of the copy group. What is a copy group will be described later with reference to FIG. 12.

FIG. 10 is an explanatory diagram of an example of the volume management table 2401 stored in the shared memory 240.

The volume management table 2401 holds the state of logical volumes of the disk drives 260 connected to the primary storage control unit 200.

The volume management table 2401 comprises a volume ID 24011, a volume state 24012, a capacity 24013, a pair number 24014, a copy type 24015, a disk drive number 24016 and an assigned-from-head address 24017.

The volume ID 24011 indicates the identifier of a logical volume.

The volume state 24012 indicates the state of this logical volume. "Primary", "secondary", "normal", "not in use" or "trouble" is entered as the volume state 24012.

"Primary" signifies that this logical volume is the primary side volume of a copy pair. "Secondary" signifies that this logical volume is the secondary side volume of a copy pair. "Normal" signifies that this logical volume is operating normally. "Not in use" signifies that this logical volume is not in use. "Trouble" signifies that something is wrong with this logical volume.

The capacity 24013 indicates the capacity of this logical volume.

The pair number 24014 indicates, when this logical volume constitutes a defined copy pair, the pair number. The pair number 24014 coincides with the pair number 24032 in an entry of the pair management table 2403 for the corresponding volume ID.

The copy type 24015 indicates, when this logical volume constitutes a defined copy pair, the type of the copy. The copy type 24015 coincides with the copy type 24031 in an entry of the pair management table 2403 for the corresponding volume ID.

The disk drive number 24016 indicates the identifier of one of the disk drives 260 to which this logical volume belongs.

The assigned-from-head address 24017 indicates information of an area where this logical volume is located. The area information is an address assigned to this logical volume from the head of the disk drives 260.

FIG. 11 is an explanatory diagram of an example of the path management table 2404 stored in the shared memory 240.

The path management table 2404 holds the state of paths defined by the primary host computer 100 between the storage control units.

The path management table 2404 comprises a path number 24041, a path state 24042, a primary side system I/O port number 24043, a secondary side system ID 24044, a secondary side system I/O port number 24045, a copy type 24046 and a copy group number 24047.

The path number 24041 indicates the identifier of a path.

The paths state 24042 indicates the state of a path. "Normal", "pending connection", "no path" or "time out" is entered as the path state 24042.

"Normal" signifies that this path has been established and is in a normal state. "Pending connection" signifies that processing for establishing this path is underway. "No path" signifies that this path is yet to be established. "Time out" signifies that this path has not been established because of a failure caused by a communication delay, line disconnection or the like.

The primary side system I/O port number 24043 indicates the identifier of an I/O port of a storage control unit in the primary side (copy source) storage system where the defined path starts.

The secondary side system ID 24044 indicates the identifier of a storage control unit in the primary side (copy destination) storage system where the defined path starts.

The secondary side system I/O port number 24045 indicates the identifier of an I/O port of a storage control unit in the primary side (copy destination) storage system where the defined path starts.

The copy type 24046 indicates the copy type of a copy pair that uses the defined path.

The copy group number 24047 indicates, when the copy pair that uses the defined path belongs to a copy group, the identifier of the copy group.

Described next is the copy control processing executed by the storage control program 1202 of the primary host computer 100.

Figure 12:
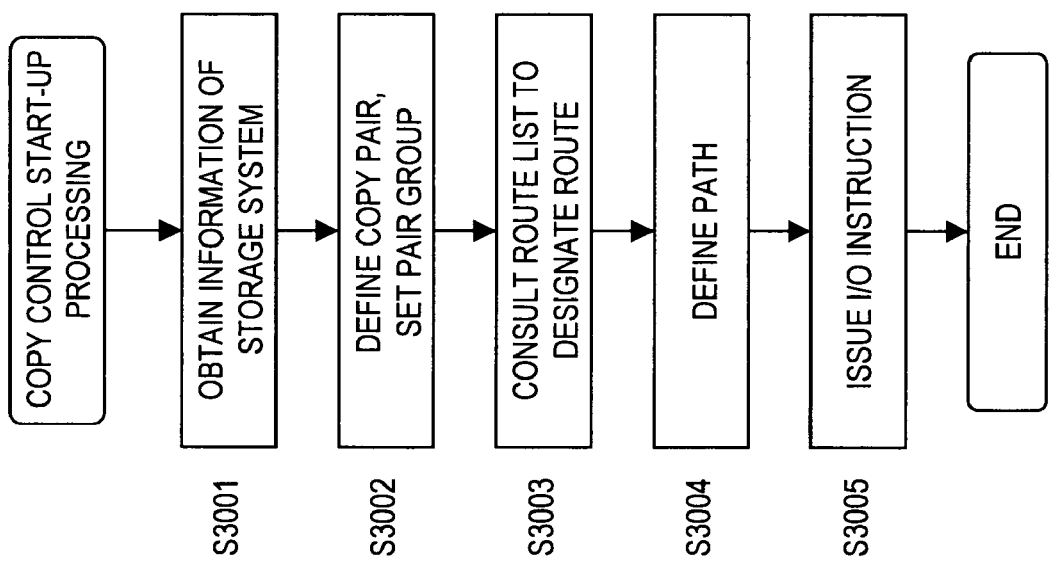
FIG. 12 is a more detailed flow chart of the copy control start-up processing according to the embodiment of this invention.

FIG. 12 is a more detailed flow chart of the copy control start-up processing.

First, the storage control program 1202 obtains, from a storage system, information necessary to define a path (a step S3001). Information to be obtained includes the identifier of this storage system (storage system ID) and the identifier of a logical volume (volume ID).

The storage control program 1202 obtains this information from the primary storage control unit 200 using such a communication protocol as SCSI or Fibre Channel. In the case where more detailed information is needed, the storage control program 1202 issues an I/O instruction to obtain the information, and the primary storage control unit 200 sends the information in response to the I/O instruction.

When the storage control program 1202 of the primary host computer 100 needs information of the local storage system 20, the program asks the storage control program 1202 of the secondary host computer 300 to provide the information.

The obtained information is stored in the storage system information table 1205 of the memory 120.

The storage control program 1202 stores, in the route list 1209 of the memory 120, information on a route of a storage control unit that is not connected to the primary host computer 100, in other words, information on a route of the local storage control unit 400 or the remote storage control unit 500.

The storage control program 1202 next defines a copy pair (a step S3002).

The storage control program 1202 defines a logical volume in a disk drive of a copy source storage system (primary side volume), a logical volume in a disk drive of a copy destination storage system (secondary side volume), and the type of the copy.

Plural copy pairs may be grouped into one to be controlled together. Such a group is called a copy group. Copy control on a copy group basis is called copy group control.

For instance, consider a case where two logical volumes are set in the primary storage system 10 and the two logical volumes are duplicated. In this case, two copy pairs each composed of a logical volume in the primary storage system 10 and a logical volume in the local storage system 20 are defined. The two copy pairs are set to constitute one copy group. The duplicated logical volumes of the primary storage system 10 are thus copied to the local storage system 20 through the two copy pairs.

Information of a set copy group is stored in the copy group information table 1206 of the memory 120.

The storage control program 1202 next specifies, from the defined copy source storage system and copy destination storage system of the copy pair and from the route list 1209, a route to be used by the copy pair (a step S3003).

Then a path is defined from the specified route (a step S3004).

The storage control program 1202 designates an I/O port number of a host adapter in a storage control unit of the primary side (copy source) storage system and an I/O port number of a host adapter in a storage control unit of the secondary side (copy destination) storage system. A path is defined by establishing a session between the two I/O ports.

Configuration information of the defined path is stored in the path configuration table 1207 of the memory 120 in the primary host computer 100.

Next, the storage control program 1202 creates an I/O instruction and issues the created I/O instruction to the primary storage control unit 200 (a step S3005).

The created I/O instruction points out the defined path, the defined copy pair, and the set copy group to the primary storage control unit 200. The created tables (the storage system information table 1205, the copy group information table 1206, the path configuration table 1207 and the route list 1209) are transferred to the local storage control unit 400. The I/O instruction and the tables are used in fail over processing, which will be described later.

Figure 13:
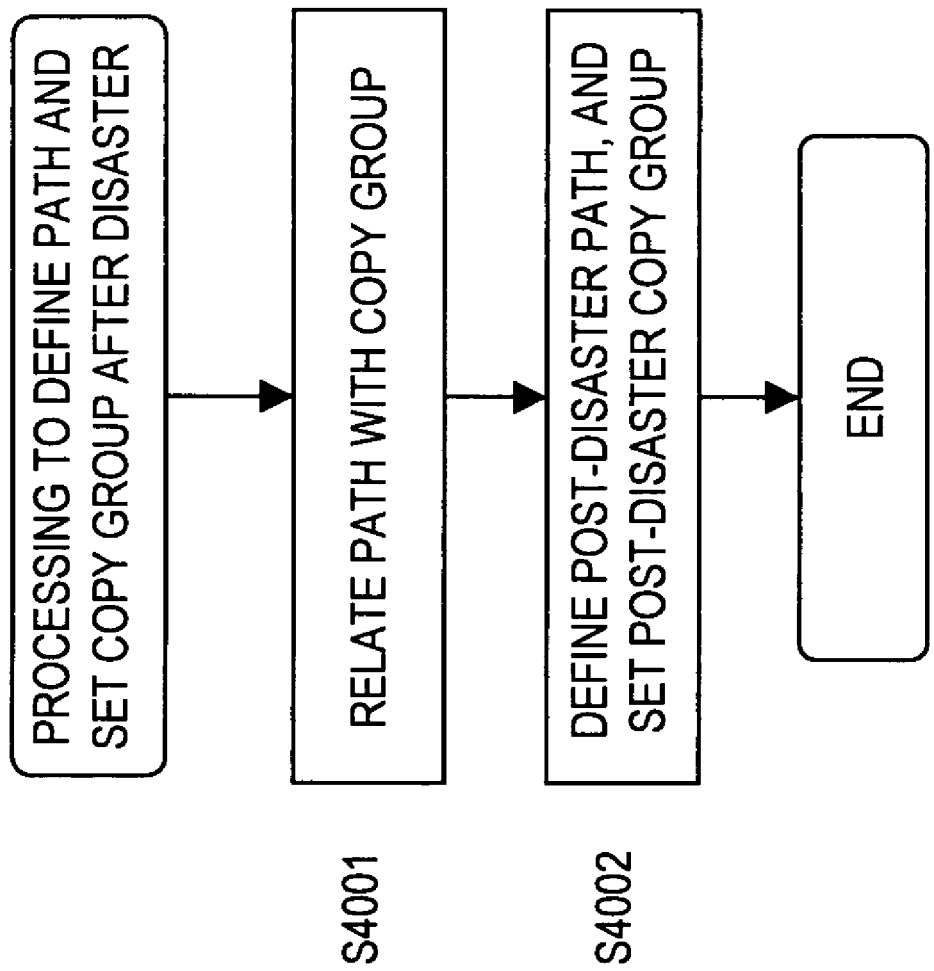
FIG. 13 is a flow chart of processing to define a path and set a copy group after a disaster strikes according to the embodiment of this invention.

FIG. 13 is a flow chart of processing to define a path and set a copy group after a disaster strikes. The processing is executed by the storage control program 1202 of the primary host computer 100.

In this embodiment, when a failure in the primary host computer 100 halts processing of the primary host computer 100, the secondary host computer 300 takes over the processing of the primary host computer 100. This is called fail over (recovery from failure).

For fail over, paths between storage control units are changed. A path change is accompanied by a change of copy group settings. A defined path and a set copy group are related to each other, and the relation is stored in the path-copy group relation table 1208. When a path is changed, the secondary host computer 300 consults the path-copy group relation table 1208 to change settings of a copy group that is related to the path. The relevant path-copy group relation table 1208 is transferred to the secondary host computer 300 in order to enable the secondary host computer 300 to change copy group settings.

The storage control program 1202 first relates a defined path to a set copy group (a step S4001).

Specifically, the storage control program 1202 obtains configuration information of the path from the path configuration table 1207, and retrieves, from the copy group information table 1206, information of a copy group that uses the path of which configuration information has been obtained. The obtained path ID and copy group ID are stored in the path-copy group relation table 1208 in relation with each other.

Next, a post-disaster path is defined and a post-disaster copy group is set (a step S4002).

The post-disaster path sets how a path definition and a copy group are set after a failure occurs in the primary host computer 100.

In the case where a failure halts processing of the primary host computer 100 alone, the primary storage control unit 200 keeps operating. The processing of the primary host computer 100 is therefore handed over to the secondary host computer 300 through fail over. Then the disk drives 460 of the local storage control unit 400 connected to the secondary host computer 300 are set as primary side disk drives. The disk drives 260 of the primary storage control unit 200 are set as secondary side disk drives. The path definition is changed in accordance with this setting and copy group settings are changed accordingly.

The path definition change is achieved by updating some configuration information items (storage system ID and the like) of the path configuration table 1207 that are changed after the disaster. Based on the path configuration table 1207 updated after the disaster, a new copy group is created after the disaster.

As the path definition change is completed and the copy group setting change to create a new copy group after the disaster is completed, the storage control program 1202 notifies of the completion as well as the name of the newly created post-disaster copy group (the copy group number of the copy group is notified as its copy group name). The copy group name is created by the storage control program 1202. Alternatively, a user may designate a copy group name. For the newly created copy group, the storage control program 1202 adds a new path ID and a copy group ID as its copy group name are added to the path-copy group relation table 1208.

The storage control program 1202 creates the copy group using a change table 1250. The change table 1250 is created by either the storage control program 1202 of the primary host computer 100 or the storage control program 1202 of the secondary host computer 300. In the case where the change table 1250 is created in the primary host computer 100, the created change table 1250 has to be transferred to the secondary host computer 300. Once created, the change table 1250 is stored in the memory 120 in each host computer.

Figure 14:
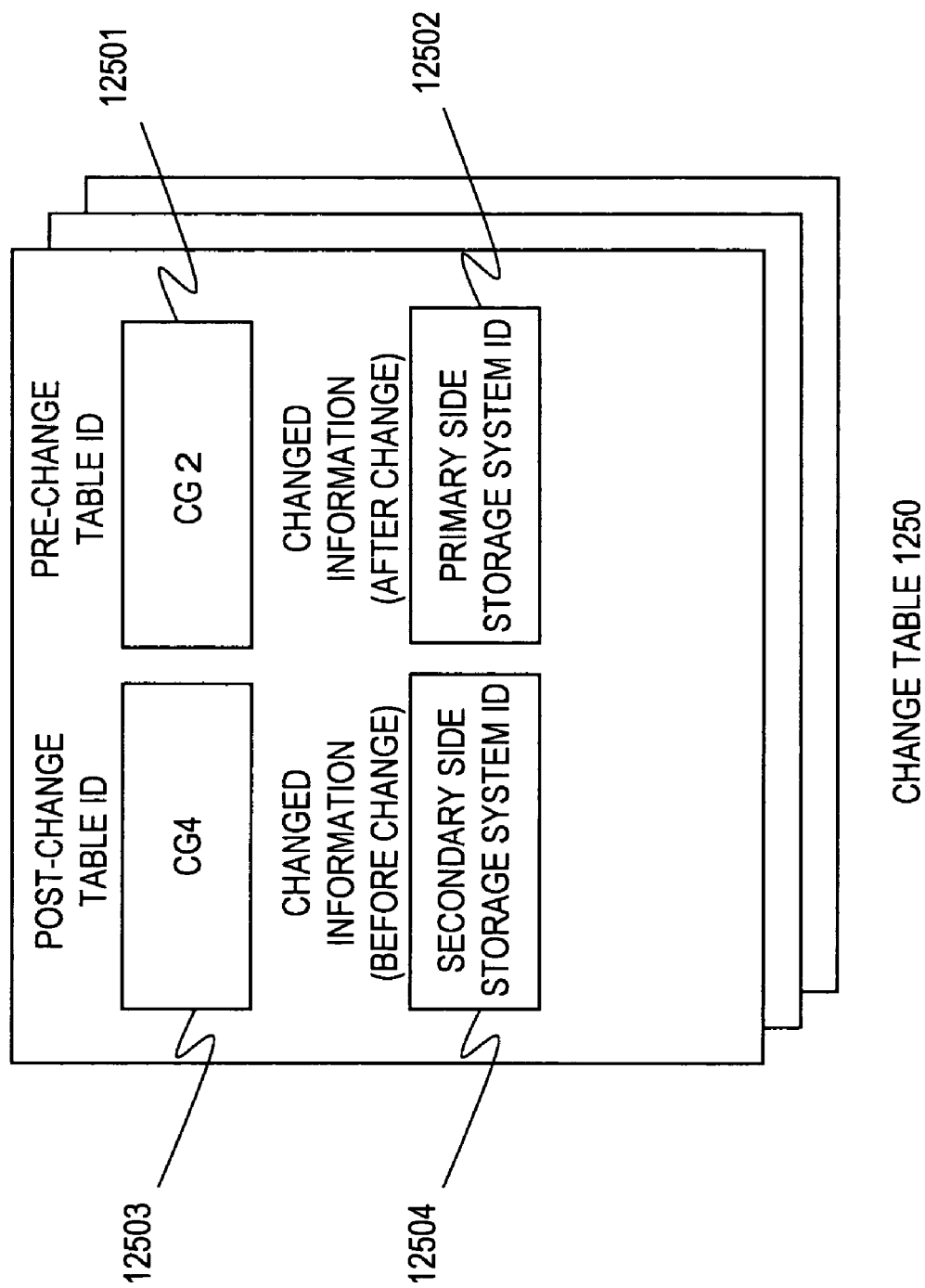
FIG. 14 is an explanatory diagram of a change table 1250 according to the embodiment of this invention.

FIG. 14 shows an example of the change table 1250.

The change table 1250 comprises a pre-change table ID 12501, a post-change table ID 12503, changed information (before change) 12504 and changed information (after change) 12502.

The pre-change table ID 12501 indicates the identifier (copy group name) of the path configuration table 1207 that is to be changed after a disaster.

The post-change table ID 12503 indicates the identifier (copy group name) of the path configuration table 1207 after the disaster.

The changed information (before change) 12504 indicates what configuration information is to be changed after the disaster.

The changed information (after change) 12502 indicates post-disaster configuration information.

Steps of creating the change table 1250 will be described.

Once a post-disaster path is defined, the storage control program 1202 creates the change table 1250.

The storage control program 1202 creates a copy group number control I/O instruction, and registers the relevant copy group number as the post-change table ID 12503. From the ID (path number) in the path configuration table 1207 that has been consulted to create a post-disaster configuration, the storage control program 1202 designates the path-copy group relation table 1208 and registers ID of the table as the pre-change table ID 12501 in the change table. Of configuration information items in the path configuration table that are changed after a disaster, pre-change information is registered as the changed information (before change) 12504 in the change table by the storage control program 1202, and post-change information as the changed information (after change) 12502.

Figure 15:
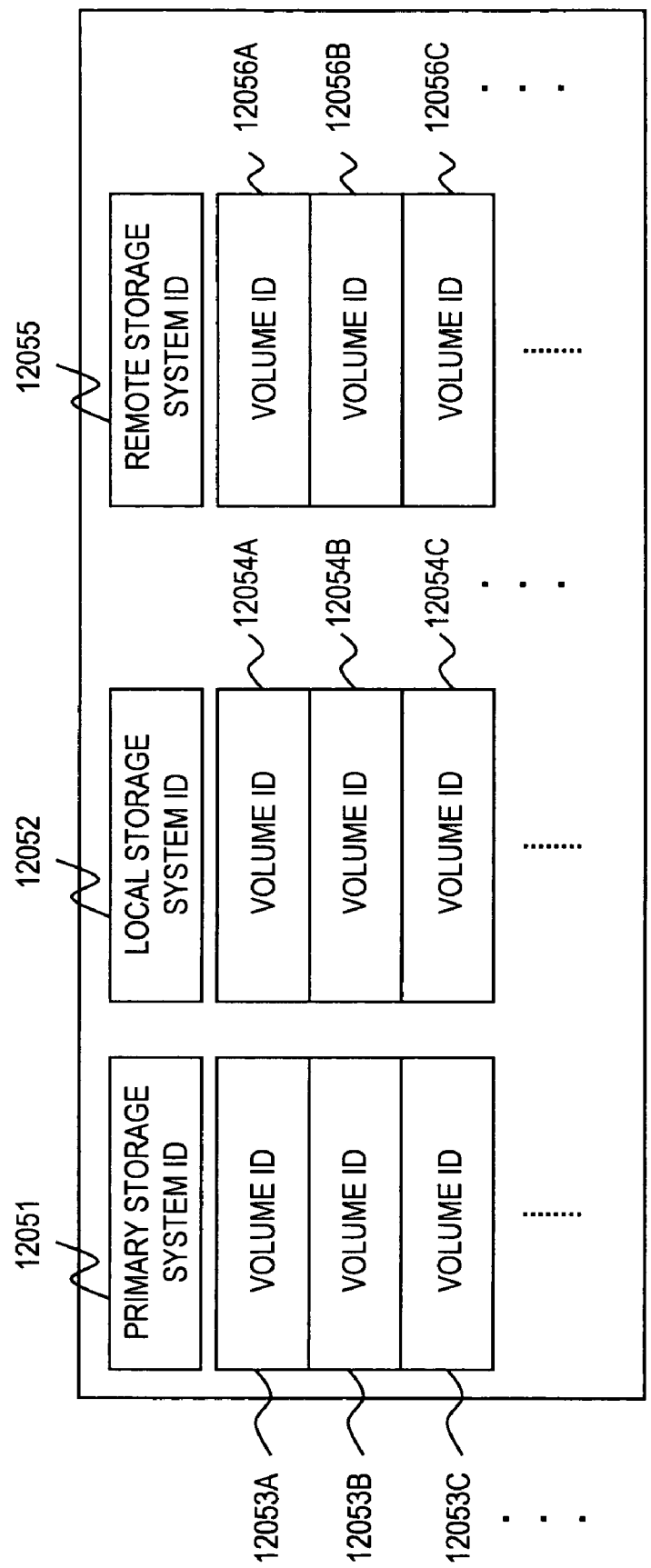
FIG. 15 is an explanatory diagram of a storage system information table 1205 according to the embodiment of this invention.

FIG. 15 is an explanatory diagram of the storage system information table 1205.

The storage system information table 1205 comprises a primary storage system ID 12051, a local storage system ID 12052, a remote storage system ID 12055, a volume ID 12053 (12053A, 12053B, . . . ), a volume ID 12054 (12054A, 12054B, . . . ) and a volume ID 12056 (12056A, 12056B, . . . ).

The primary storage system ID 12051 indicates the identifier of the primary storage system 10.

The local storage system ID 12052 indicates the identifier of the local storage system 20.

The remote storage system ID 12055 indicates the identifier of the remote storage system 30.

The volume ID 12053 indicates the identifier of a logical volume in the primary system 10. When the remote storage system 30 has plural logical volumes, as shown in FIG. 15, identifiers of plural logical volumes related to the primary storage system ID 12051 are stored.

The volume ID 12054 indicates the identifier of a logical volume in the local storage system 20. When the local storage system 20 has plural logical volumes, as shown in FIG. 15, identifiers of plural logical volumes related to the local storage system ID 12052 are stored as the volume ID 12054.

The volume ID 12056 indicates the identifier of a logical volume in the remote storage system 30. When the remote storage system 30 has plural logical volumes, identifiers of plural logical volumes related to the remote storage system ID 12055 are stored as the volume ID 12056 as shown in FIG. 15.

Figure 16:
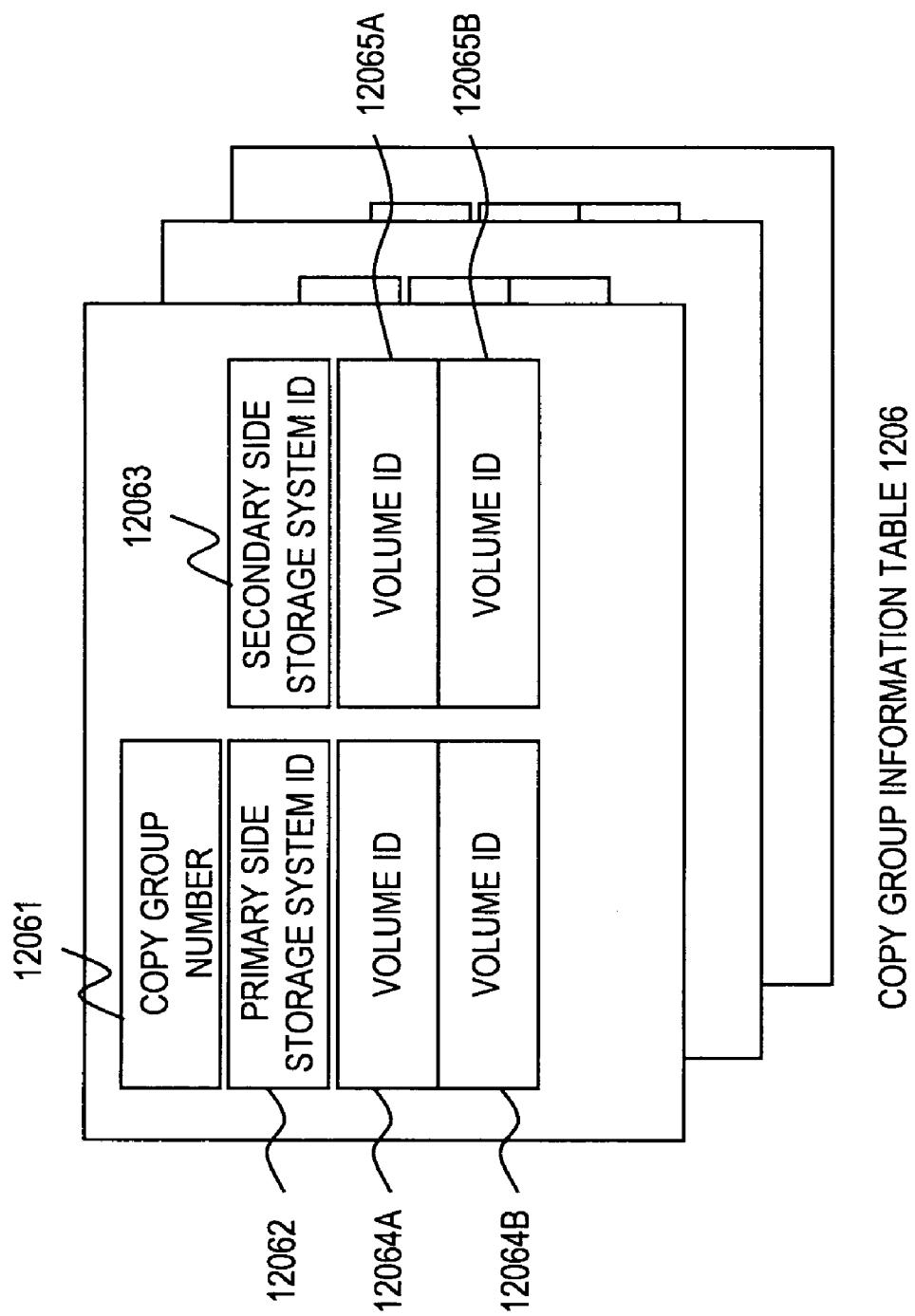
FIG. 16 is an explanatory diagram of a copy group information table 1206 according to the embodiment of this invention.

FIG. 16 is an explanatory diagram of the copy group information table 1206.

The copy group information table 1206 comprises a copy group number 12061, a primary side storage system ID 12062, a secondary side storage system ID 12063, a volume ID 12064 (12064A, 12064B, . . . ) and a volume ID 12065 (12065A, 12065B, . . . ). A set of these items represents information of one copy group. The copy group information table 1206 can hold information of plural copy groups.

The copy group number 12061 indicates the identifier of the copy group in question.

The primary side storage system ID 12062 indicates the identifier of a primary side (copy source) storage system. The secondary side storage system ID 12063 indicates the identifier of a secondary side (copy destination) storage system.

The volume ID 12064 indicates the identifier of a logical volume in a primary side (copy source) storage system. The volume ID 12065 indicates the identifier of a logical volume in a secondary side (copy destination) storage system.

Figure 17:
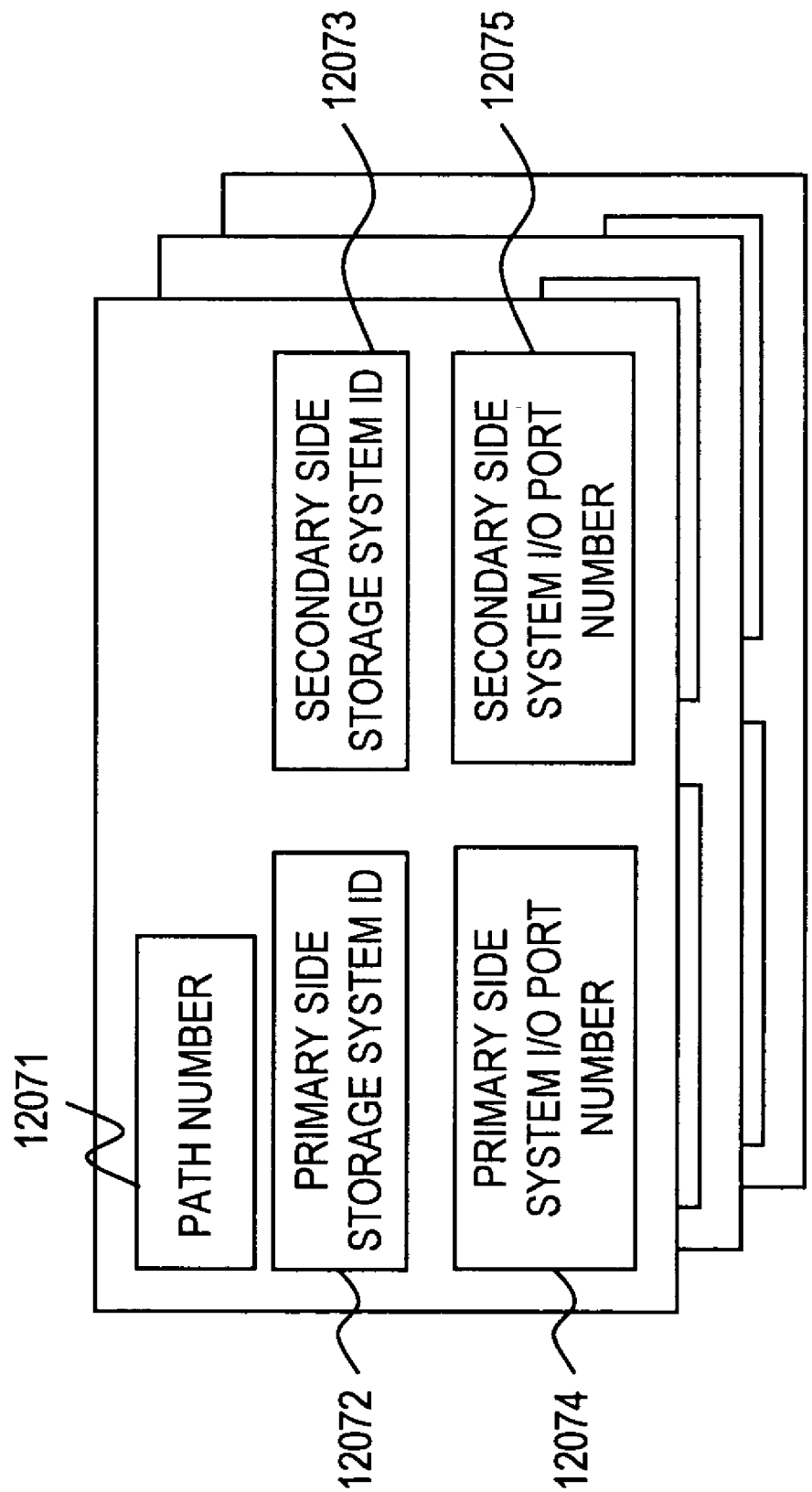
FIG. 17 is an explanatory diagram of a path configuration table 1207 according to the embodiment of this invention.

FIG. 17 is an explanatory diagram of the path configuration table 1207.

The path configuration table 1207 comprises a path number 12071, a primary side storage system ID 12072, a secondary side storage system ID 12073, a primary side system I/O port number 12074 and a secondary side system I/O port number 12075. A set of these items represents configuration information of one path. The path configuration table 1207 can hold configuration information of plural paths.

The path number 12071 indicates the identifier of the path in question.

The primary side storage system ID 12072 indicates the identifier of the primary side (copy source) storage system. The secondary side storage system ID 12073 indicates the identifier of the secondary side (copy destination) storage system.

The primary side system I/O port number 12074 indicates the identifier of an I/O port of a host adapter in the storage control unit of the primary side (copy source) storage system. The secondary side system I/O port number 12075 indicates the identifier of an I/O port of a host adapter in a storage control unit of a secondary side (copy destination) storage system.

Figure 18:
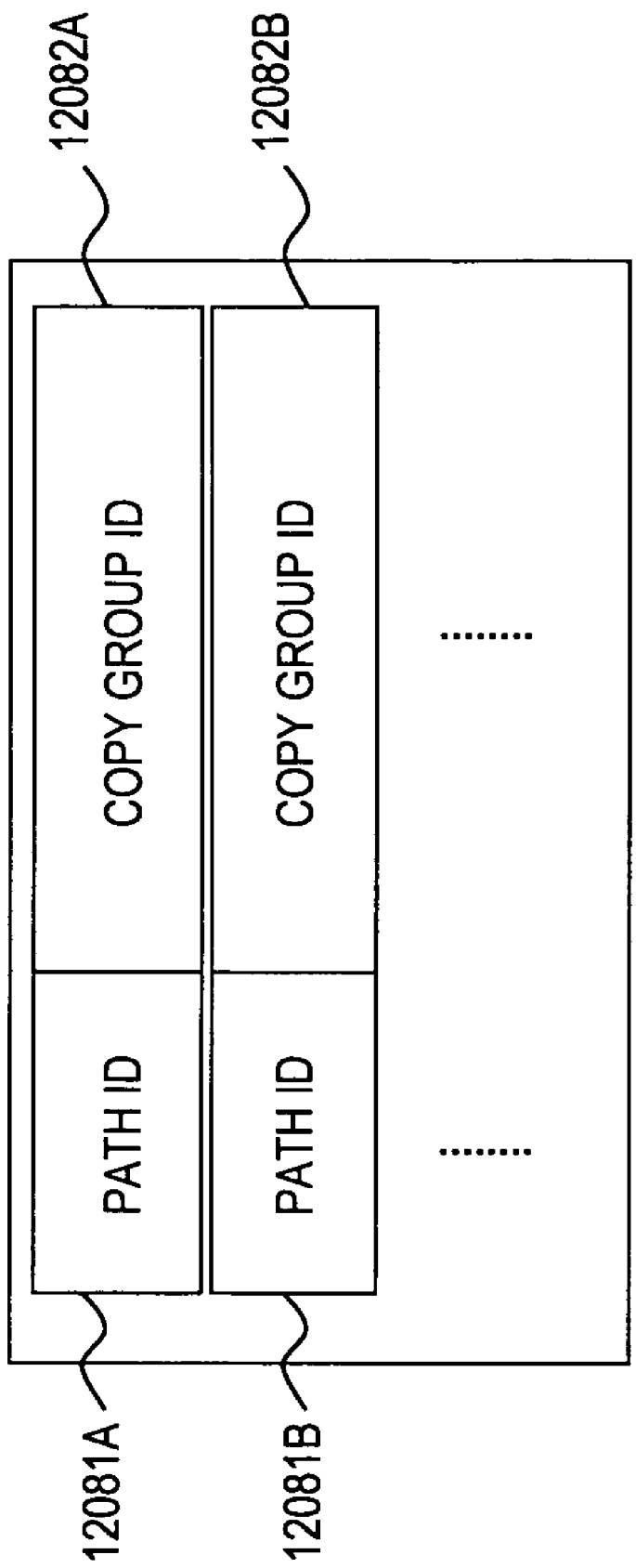
FIG. 18 is an explanatory diagram of a path-copy group relation table 1208.

FIG. 18 is an explanatory diagram of the path-copy group relation table 1208.

The path-copy group relation table 1208 comprises a path ID 12081 (12081A, 12081B, . . . ) and a copy group ID 12082 (12082A, 12082B, . . . ), which points to a copy group related to a path that has the path ID.

The path ID 12081 indicates the identifier of a path defined.

The copy group ID 12082 indicates the identifier of a set copy group.

Figure 19:
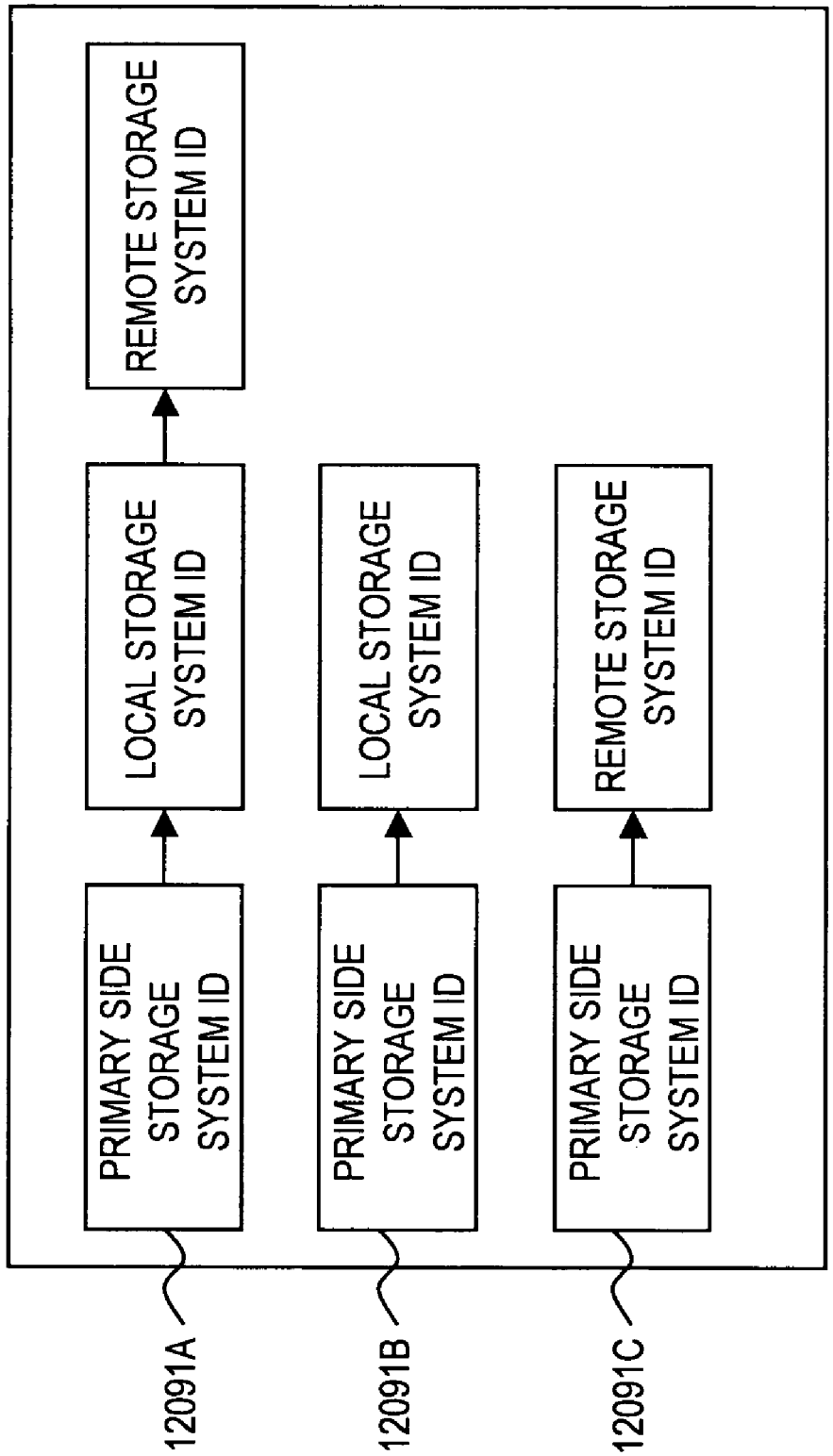
FIG. 19 is an explanatory diagram of a route list 1209 according to the embodiment of this invention.

FIG. 19 is an explanatory diagram of the route list 1209.

The route list 1209 comprises route information 12091. The route list 1209 can hold plural pieces of route information 12091 (12091A, 12091B, . . . ).

Stored as the route information 12091 is information of a route from the primary storage system 10, to which the primary host computer 100 is connected, to the local storage system 20 that has the objective storage control unit or to the remote storage system 30.

For instance, route information 12091A is information of a route from the primary storage system 10 to the remote storage system 30 via the local storage system 20. As shown in FIG. 1, a communication channel to the local storage control unit 400 of the local storage system 20 is connected to the primary storage control unit 200 of the primary storage system 10, and a communication channel to the remote storage control unit 500 of the remote storage system 30 is connected to the local storage control unit 400 of the local storage system 20. Information of this route is contained as the route information 12091A in the route list 1209.

A communication channel to the remote storage control unit 500 of the remote storage system 30 is also connected to the primary storage control unit 200 of the primary storage system 10. Information of this route is contained as route information 12091C in the route list 1209.

The route information 12091 is used to set the I/O instruction described above with reference to FIG. 6. When there is no route information, in other words, when an I/O instruction is directed to the primary storage control unit 200 connected to the primary host computer 100, the I/O instruction is the control I/O instruction 12021A. When there is route information 12091 set, an I/O instruction issued is a command chain composed of the control I/O instruction 12021A, the transfer I/O instruction 12021B and the remote I/O instruction 12021C.

The transfer I/O instruction 12021B of the command chain depends on the number of storage control units along the route.

Figure 20:
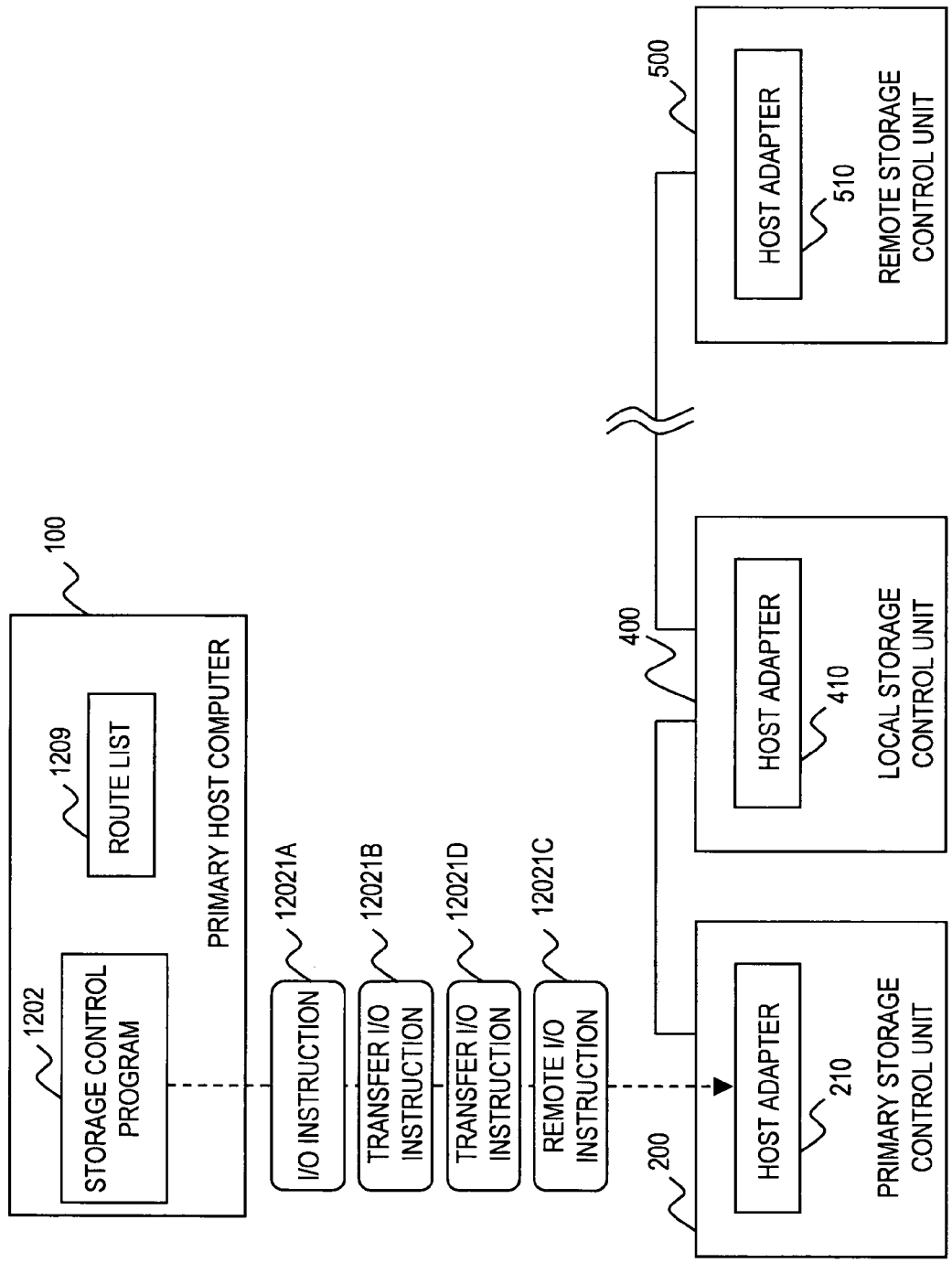
FIG. 20 is an explanatory diagram of I/O instruction issue according to the embodiment of this invention.

FIG. 20 is an explanatory diagram of how the primary host computer 100 issues an I/O instruction.

A case where the primary host computer issues an I/O instruction to the remote storage control unit 500 will be described.

The storage control program 1202 of the primary host computer 100 consults the route list 1209 to obtain the route information 12091A, which is information of the route to the remote storage control unit 500 where the I/O instruction is directed and which is shown in FIG. 19.

The obtained route information 12091A shows information of the route from the primary host computer 100 to the remote storage control unit 500 via the primary storage control unit 200 and the local storage control unit 400.

The storage control program 1202 creates a command chain corresponding to the route information 12091A.

The command chain comprises the control I/O instruction 12021A, the transfer I/O instruction 12021B, a transfer I/O instruction 12021D and the remote I/O instruction 12021C. The control I/O instruction 12021A is an I/O instruction directed to the remote storage control unit 500. The transfer I/O instruction 12021B contains the transfer instruction 12029 that instructs a transfer from the local storage control unit 400 to the remote storage control unit 500. The transfer I/O instruction 12021D contains the transfer instruction 12029 that instructs a transfer from the primary storage control unit 200 to the local storage control unit 400. The remote I/O instruction 12021C contains the remote I/O control instruction 12030, which indicates that this command chain is for remote I/O.

The storage control program 1202 issues the created command chain to one of the host adapters 210 in the primary storage control unit 200.

The processor 211 of the one of the host adapters 210 that has received the command chain checks the remote I/O instruction 12021C and judges that this command chain is to be transferred to another storage control unit. The processor 211 then consults the transfer I/O instruction 12021D indicated by the remote I/O instruction 12021C, and transfers this command chain to the local storage control unit 400 which is the transfer destination.

At this point, the processor 211 of the one of the host adapters 210 that has received the command chain retrieves the transfer I/O instruction 12021D from the command chain, and rewrites the remote I/O instruction 12021C into information that indicates the transfer I/O instruction 12021B.

The transferred command chain is received by one of the host adapters 410 in the local storage control unit 400.

The processor 411 of the one of the host adapters 410 that has received the command chain checks the remote I/O instruction 12021C and judges that this command chain is to be transferred to another storage control unit.

The processor 411 of the one of the host adapters 410 that has received the command chain consults the transfer I/O instruction 12021B indicated by the remote I/O instruction 12021C to determine that the destination is the remote storage control unit 500.

Then the processor 411 of the one of the host adapters 410 that has received the command chain deletes the transfer I/O instruction 12021B and the remote I/O instruction 12021C from the command chain. As a result, the command chain now consists solely of the control I/O instruction 12021A.

This control I/O instruction 12021 A is transferred to the remote storage control unit 500 by the processor 411 of the one of the host adapters 410 that has received the command chain.

One of the host adapters 510 in the remote storage control unit 500 receives this control I/O instruction 12021A. The processor 511 of the one of the host adapters 510 that has received the control I/O instruction 12021A processes this I/O instruction.

Topology control will be described next.

The topology control program 1201 of the primary host computer 100 is operated on a level higher than that of the storage control program 1202, and has a user interface which receives an instruction from a user.

When receiving an instruction from a user, the topology control program 1201 sends this instruction to the storage control program 1202. The storage control program 1202 creates and issues an I/O instruction based on the received instruction.

The topology control program 1201 has a user interface.

User interfaces are generally classified into GUIs (graphic user interfaces) and CLIs (command line user interfaces). The user interface employed by the topology control program 1201 of this embodiment is a CLI.

Figure 21:
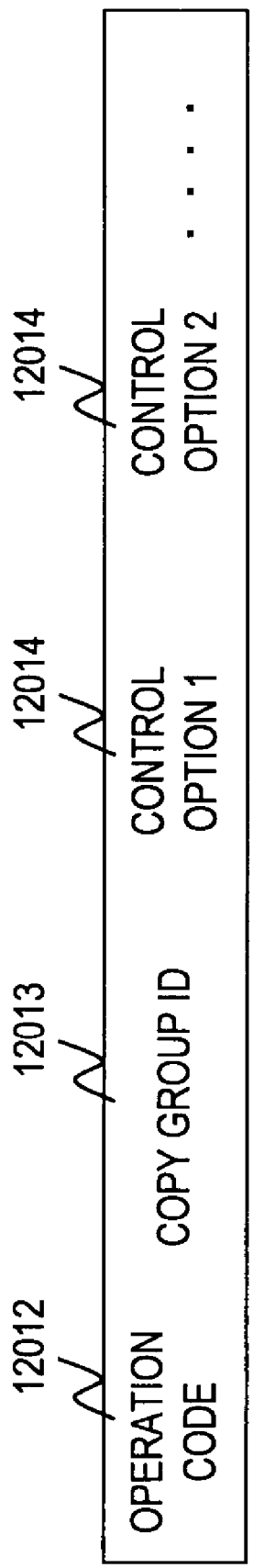
FIG. 21 is an explanatory diagram of a storage control CLI 12011 according to the embodiment of this invention.

FIG. 21 is an explanatory diagram of a storage control CLI 12011 of the topology control program 1201.

The storage control CLI 12011 comprises an operation code 12012, a copy group ID 12013 and a control option 12014. A user designates each of these items to control the storage control unit.

The operation code 12012 indicates what a processing instruction is.

The copy group ID 12013 indicates the identifier of a copy group on which the instructed processing is performed.

The control option 12014 designates a control option prepared for each operation code 12012. A user can designate plural control options as the control option 12014.

FIG. 22 is an explanatory diagram showing the operation code 12012 and the specifics of the operation code 12012.

For instance, MAKE is an operation code that instructs to start copy processing. When instructed to start copy processing, the primary storage control unit 200 first starts the initial copy processing and, after the initial copy processing is terminated, moves onto a steady copy processing.

Described next is how the storage control program 1202 operates upon receiving a CLI instruction.

Figure 23:
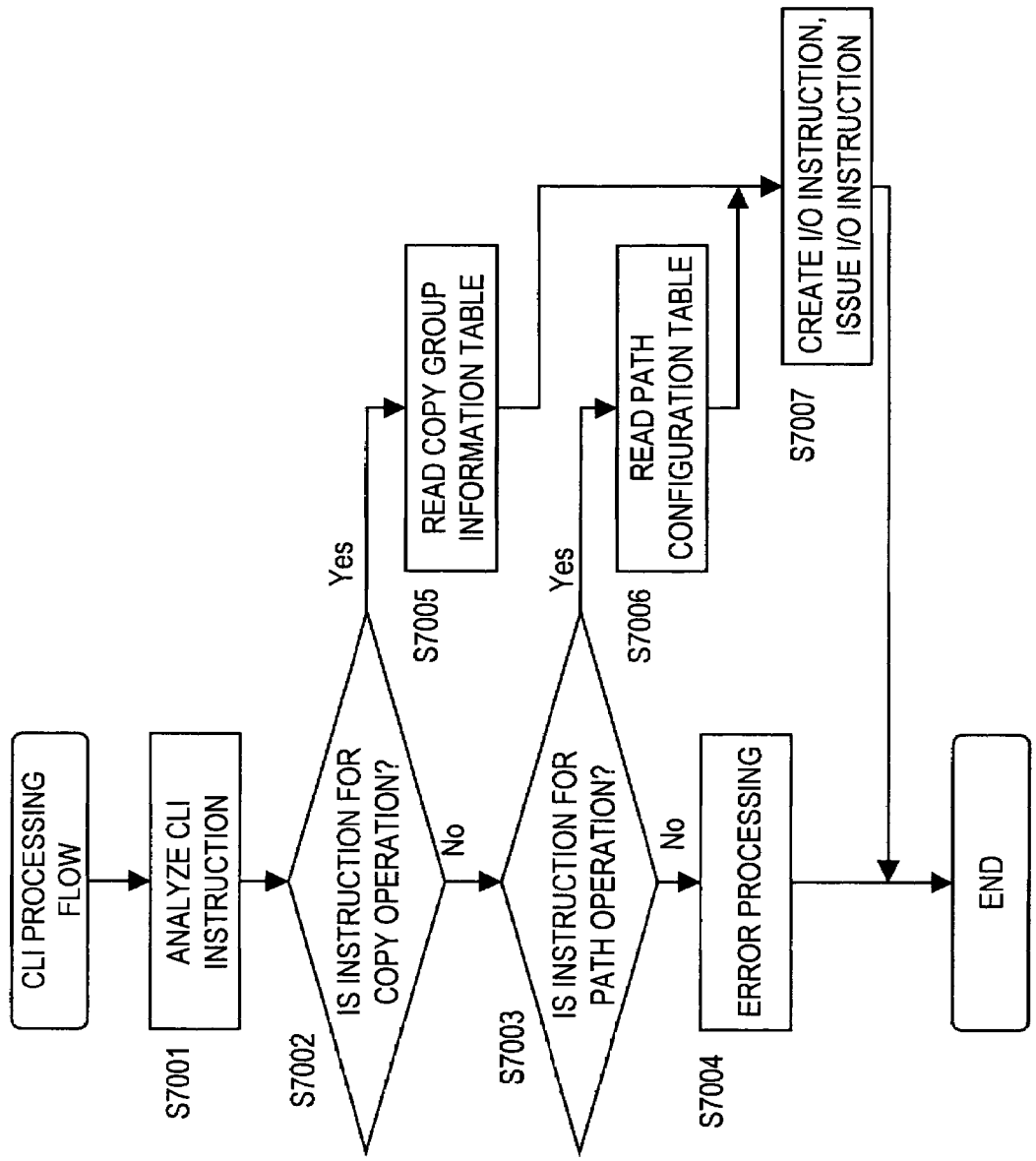
FIG. 23 is a flow chart of CLI processing according to the embodiment of this invention.

FIG. 23 is a flow chart of CLI processing executed by the storage control program 1202.

This processing is executed when the storage control program 1202 receives a CLI instruction.

First, the storage control program 1202 analyzes the received CLI instruction, namely, the operation code 12012 of the CLI instruction.

The storage control program 1202 judges, as a result of the analysis in the step S7002. Whether the operation code 12012 of the CLI instruction indicate a copy operation or not. If it is judged as a copy operation, the storage control program reads the copy group information table 1206, based on the copy group number recorded in the copy group number ID 12013 and obtains this copy group information (a step S7005). After the copy group information is obtained, the storage control program 1202 creates an I/O instruction for the primary storage control unit 200 and issues this I/O instruction to the primary storage control unit 200. Receiving a response to the I/O instruction from the primary storage control unit 200, the storage control program 1202 sends this response to the topology control program 1201.

When the storage control program 1202 judges as a result of the analysis in the step S7001 that the operation code 12012 of the CLI instruction does not indicate a copy operation, the storage control program 1202 judges whether this operation code 12012 indicates a path operation or not (a step S7003). When the operation code 12012 is judged as a path operation, a path number entered as the copy group ID 12013 is used to read the path configuration table 1207 and obtain relevant path configuration information (a step S7006). After the path configuration information is obtained, the storage control program 1202 creates an I/O instruction for the primary storage control unit 200 and issues this I/O instruction to the primary storage control unit 200. Receiving a response to the I/O instruction from the primary storage control unit 200, the storage control program 1202 sends this response to the topology control program 1201.

When the storage control program 1202 judges as a result of the analysis in the step S7001 that the operation code 12021 of the CLI instruction indicates neither path operation nor copy operation, the storage control program 1202 sends an error message in response to the CLI instruction to the topology control program 1201 (a step S7004).

The topology control program 1201 executes a processing flow in accordance with a response to a CLI instruction. Shown here is a flow of the storage control program 1202 loaded onto the primary host computer 100, however, even if it is a storage control program of the secondary host computer 300 and a CLI instruction from the topology control program is executed through the same processing flow. However, the secondary host computer processes a CLI instruction using tables (the copy group information table 1206, the path configuration table 1207 and others) that are transferred from the primary host computer in advance.

The description given next is about processing executed by the topology control program 1201.

A topology for when the storage network system shown in FIG. 1 is run normally will be described first. This topology will hereinafter be referred to as normal system topology.

Figure 24:
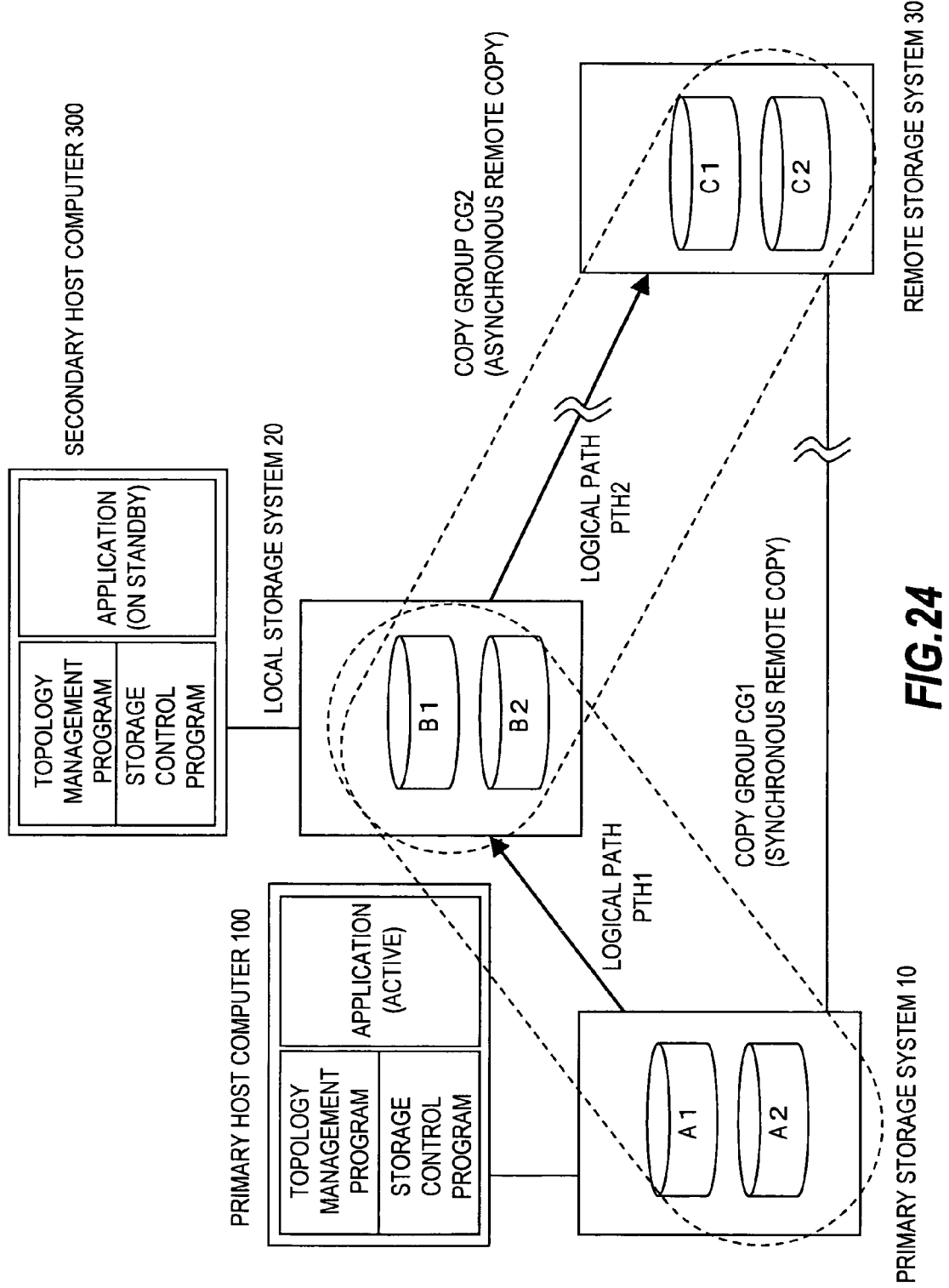
FIG. 24 is a block diagram showing a normal system topology according to the embodiment of this invention.

FIG. 24 is a block diagram showing the normal system topology of the storage network system.

Logical volumes A1 and A2 are set in disk drives 260 of the primary storage system 10. Logical volumes B1 and B2 are set in the disk drives 460 of the local storage system 20. Logical volumes C1 and C2 are set in the disk drives 560 of the remote storage system 30.

The application 1204 of the primary host computer 100 is in an active state, in other words, is executing a service the storage network system provides. On the other hand, the secondary host computer 300 is in a standby state, in other words, is on standby for execution of a service the storage network system provides.

A logical path PTH1 is defined and established between the primary storage system 10 and the local storage system 20 with the primary storage system 10 as the primary side and the local storage system 20 as the secondary side. A logical path PTH2 is defined and established between the local storage system 20 and the remote storage system 30 with the local storage system 20 as the primary side and the remote storage system 30 as the secondary side. A physical communication channel is provided between the primary storage system 10 and the remote storage system 30, but no path has been established between the two.

A copy pair for asynchronous remote copy is defined with the logical volume B1 of the local storage control unit 400 as the primary side volume and the logical volume C1 of the remote storage control unit 500 as the secondary side volume. A copy pair for asynchronous remote copy is defined with the logical volume B2 of the local storage control unit 400 as the primary side volume and the logical volume C2 of the remote storage control unit 500 as the secondary side volume. The two copy pairs constitute a copy group CG2 for asynchronous remote copy.

A copy pair for asynchronous remote copy is defined with the logical volume B1 of the local storage control unit 400 as the primary side volume and the logical volume C1 of the remote storage control unit 500 as the secondary side volume. A copy pair for asynchronous remote copy is defined with the logical volume B2 of the local storage control unit 400 as the primary side volume and the logical volume C2 of the remote storage control unit 500 as the secondary side volume. The two copy pairs constitute a copy group CG2 for asynchronous remote copy.

The following description is about processing set by a user in the topology control program 1201 of the primary host computer 100 in order to set the normal system topology.

Figure 25:
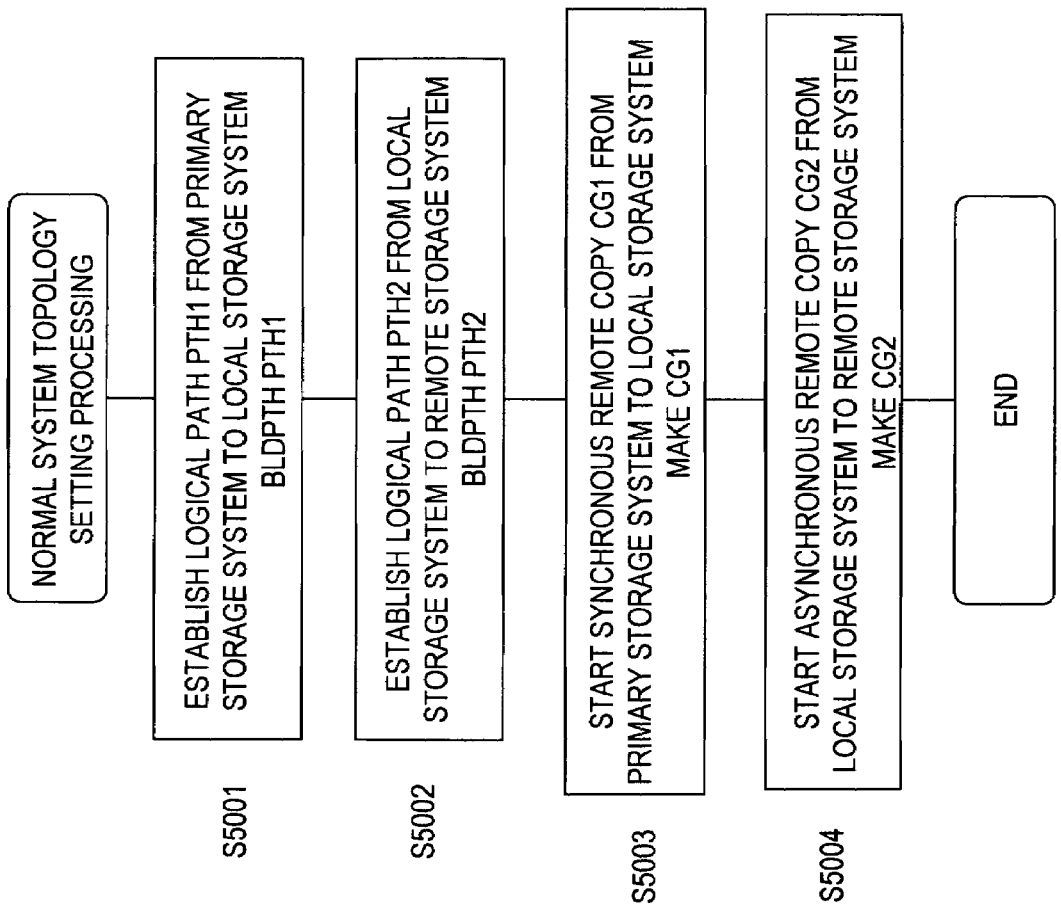
FIG. 25 is a flow chart of normal system topology setting processing according to the embodiment of this invention.

FIG. 25 is a flow chart of normal system topology setting processing of the topology control program 1201.

This processing is processed as a user gives an instruction through the primary host computer 100 to set the topology.

Firstly, a logical path PTH 1 with the primary storage system 10 as the primary side and the local storage system 20 as the secondary side is established (a step S5001). The user enters "BLDPTH PTH1" in the storage control CLI instruction.

Secondly, a new logical path PTH 2 with the local storage system 20 as the primary side and the remote storage system 30 as the secondary side is established (a step S5002). The user enters "BLDPTH PTH2" in the storage control CLI instruction.

The user next instructs to start a copy group CG1 for synchronous remote copy which is constituted of copy groups having the logical volumes A1 and A2 of the primary storage system 10 as primary side volumes and the logical volumes R1 and R2 of the local site storage system 20 as secondary side volumes (a step S5003). The user enters "MAKE CG1" in the storage control CLI instruction.

The user next instructs to start a copy group CG2 for asynchronous remote copy which is constituted of copy groups having the logical volumes B1 and B2 of the local storage system 20 as primary side volumes and the logical volumes C1 and C2 of the remote site storage system 30 as secondary side volumes (a step S6006). The user enters "MAKE CG2" in the storage control CLI instruction.

The topology control program 1201 sends those instructions to the storage control program 1202, which issues an I/O instruction based on the received instructions.

Figure 26:
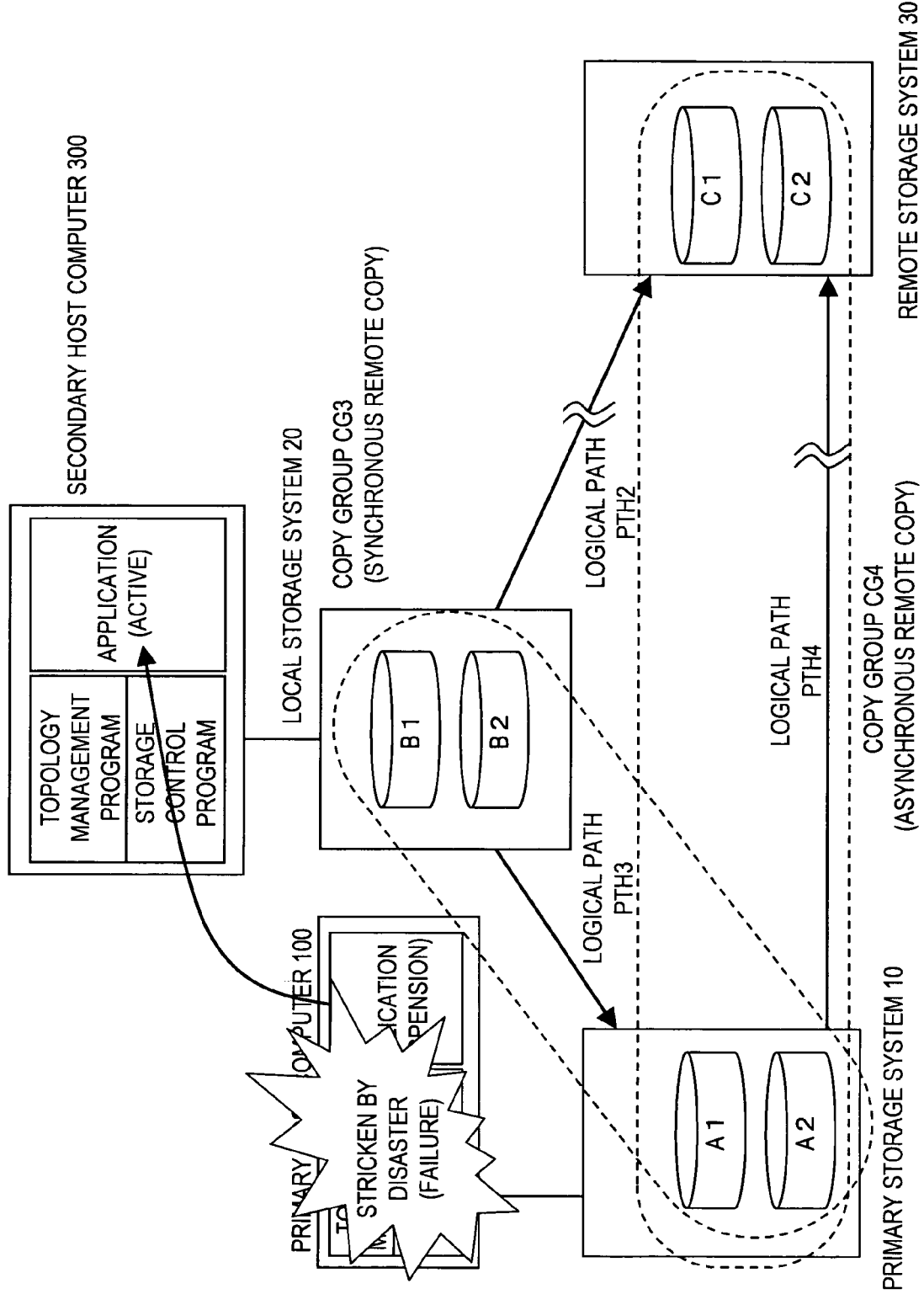
FIG. 26 is a block diagram showing an abnormal system topology according to the embodiment of this invention.

The normal system topology of FIG. 26 is set through the above processing.

Described next is a topology for when a failure occurs in the primary host computer 100 in the normal system topology. This topology will hereinafter be referred to as abnormal system topology.

FIG. 26 is a block diagram showing the abnormal system topology of the storage network system.

In the abnormal system topology, a failure occurs in the primary host computer 100 and processing of the primary host computer 100 is halted.

The failure monitoring manager 2123 of each of the host adapters 210 in the primary storage control unit 200 of the primary storage system 10 detects a failure in the primary host computer 100, and notifies the secondary host computer 300 of the failure.

Notified of the failure, the secondary host computer 300 takes place of the primary host computer 100 through fail over. The fail over puts the application 1204 of the secondary host computer 300 into an active state, and the secondary host computer 300 executes the service which the storage network system provides.

In the case where a failure is confined to the primary host computer 100, the primary storage control unit 200 is operating normally. Then processing of the primary host computer 100 and the primary storage control unit 200 in the normal system topology are executed by the secondary host computer 300 and the local storage control unit 400 whereas processing of the local storage control unit 400 in the normal system topology is executed by the primary storage control unit 200. In short, the topology is changed such that the primary side and the local side are reversed.

Figure 27:
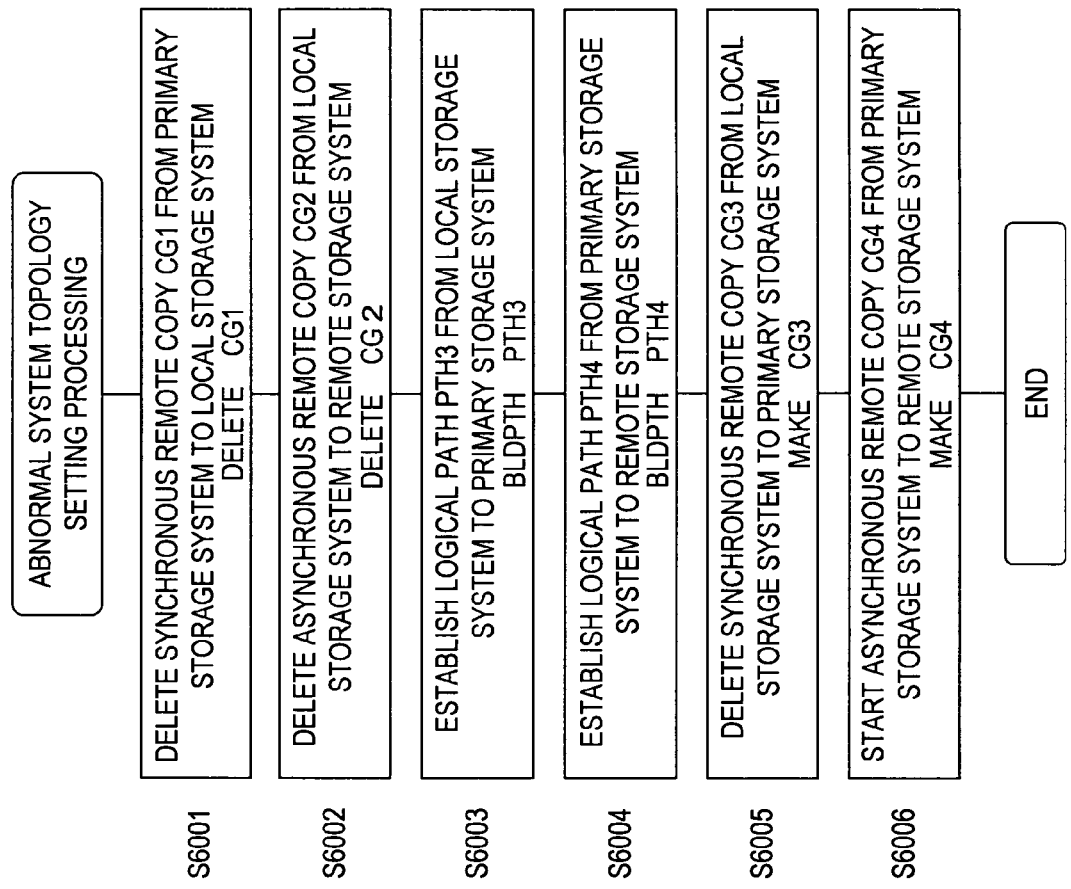
FIG. 27 is a flow chart of normal system topology setting processing according to the embodiment of this invention.

FIG. 27 is a flow chart of normal system topology setting processing of the topology control program 1201 of the secondary host computer 300.

This processing is processed as a user gives an instruction through the secondary host computer 300 notified of a failure.

The user next instructs to delete the copy group CG1 for synchronous remote copy which is constituted of the copy groups having the logical volumes A1 and A2 of the primary storage system 10 as primary side volumes and the logical volumes B1 and B2 of the local storage system 20 as secondary side volumes (a step S6001). The user enters "DELETE CG1" in the storage control CLI instruction.

The user next instructs to delete the copy group CG2 for synchronous remote copy which is constituted of the copy groups having the logical volumes B1 and B2 of the local storage system 20 as primary side volumes and the logical volumes C1 and C2 of the remote storage system 30 as secondary side volumes (a step S6002). The user enters "DELETE CG2" in the storage control CLI instruction.

Then a new logical path PTH 3 with the local storage system 20 as the primary side and the primary storage system 10 as the secondary side is established (a step S6003). The user enters "BLDPTH PTH3" in the storage control CLI instruction.

Then a new logical path PTH 4 with the primary storage system 10 as the primary side and the remote storage system 30 as the secondary side is established (a step S6003). The user enters "BLDPTH PTH4" in the storage control CLI instruction.

The user next instructs to start a copy group CG3 for synchronous remote copy which is constituted of copy groups having the logical volumes B1 and B2 of the primary storage system 10 as primary side volumes and the logical volumes C1 and C2 of the remote site storage system 30 as secondary side volumes (a step S6005). The user enters "MAKE CG3" in the storage control CLI instruction.

The user next instructs to start a copy group CG4 for asynchronous remote copy which is constituted of copy groups having the logical volumes A1 and A2 of the primary storage system 10 as primary side volumes and the logical volumes C1 and C2 of the remote site storage system 30 as secondary side volumes (a step S6006). The user enters "MAKE CG4" in the storage control CLI instruction.

The topology control program 1201 sends those instructions to the storage control program 1202, which issues an I/O instruction based on the received instructions.

The abnormal system topology of FIG. 26 is set through the above processing.

The application 1204 of the secondary host computer 300 now executes the service. As a result of executing the service, data is written in the logical volumes B1 and B2 of the local storage control unit 400. The written data is transferred to the logical volumes A1 and A2 of the primary storage system 10 which, together with the logical volumes B1 and B2, constitute a copy group for synchronous remote copy. Also, data written in the logical volumes A1 and A2 is transferred to the logical volumes C1 and C2 of the remote storage system 30 which, together with the logical volumes A1 and A2, constitute a copy group for asynchronous remote copy.

In FIG. 26, the logical path PTH2 set in the normal system topology remains being established. This path is not used in the abnormal system topology but does not have to be removed.

Copy group settings changed by the storage control program 1202 in the abnormal system topology will be described next.

Figure 28:
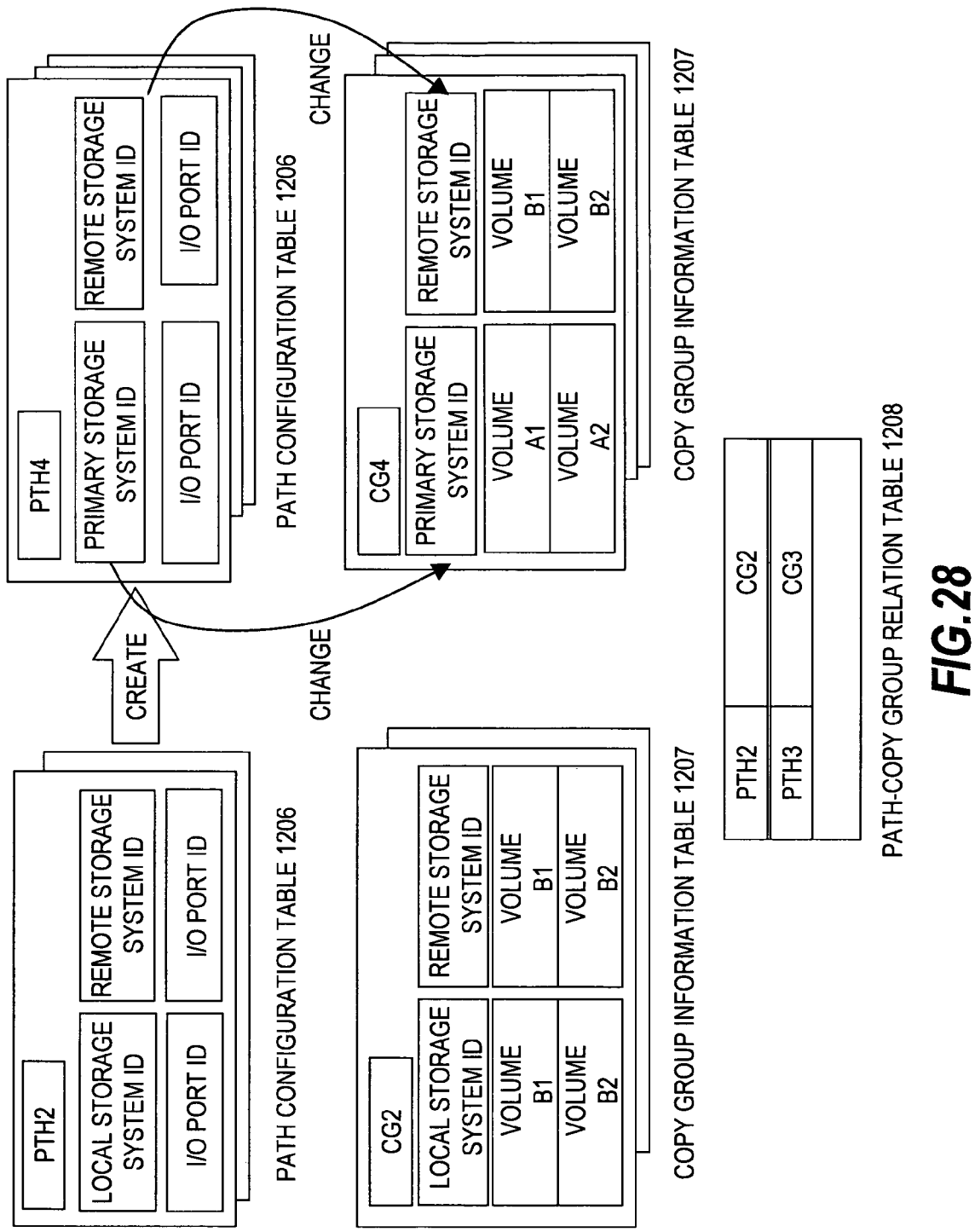
FIG. 28 is an explanatory diagram of copy group change according to the embodiment of this invention.

FIG. 28 is an explanatory diagram of how the storage control program 1202 changes copy groups.

Through the processing of FIG. 27, user's instructions are sent from the topology control program 1201 to the storage control program 1202. The storage control program 1202 issues an I/O instruction based on the received instructions.

A switch from the normal system topology to the abnormal system topology is carried out by changing, while maintaining the "primary site"-"local site"-"remote site" relation, the relation between the components of the three sites, in other words, logical paths.

For instance, in the normal system topology of FIG. 24, the copy group CG2 for asynchronous remote copy is set between the local storage system 20 and the remote storage system 30. The path the copy group CG2 uses is the logical path PTH2. The copy group-path relation is held in the path-copy group relation table 1208.

Here, a switch is made from the normal system topology to the abnormal system topology through the processing of FIG. 26. The storage control program 1202 judges that the coupling of the logical path PTH2 with the copy group CG2 has been replaced by the coupling of the new logical path PTH4 and copy group CG4.

Judging that the logical path PTH2 has been replaced by the new logical path PTH4 as a result of the processing of FIG. 27, the storage control program 1202 changes information of the copy group CG2, which has been related to the logical path PTH2.

Specifically, the logical path PTH2 is defined by the identifier of the local storage system 20 as the primary side storage system ID and by the identifier of the remote storage system 30 as the secondary side storage system ID. The logical path PTH4 is defined by the identifier of the primary storage system 10 as the primary side storage system ID and by the identifier of the remote storage system 30 as the secondary side storage system ID.

Described next is processing executed by the storage control program 1202 upon reception of a CLI instruction to judge that a new logical path and new copy group have replaced old ones.

Figure 29:
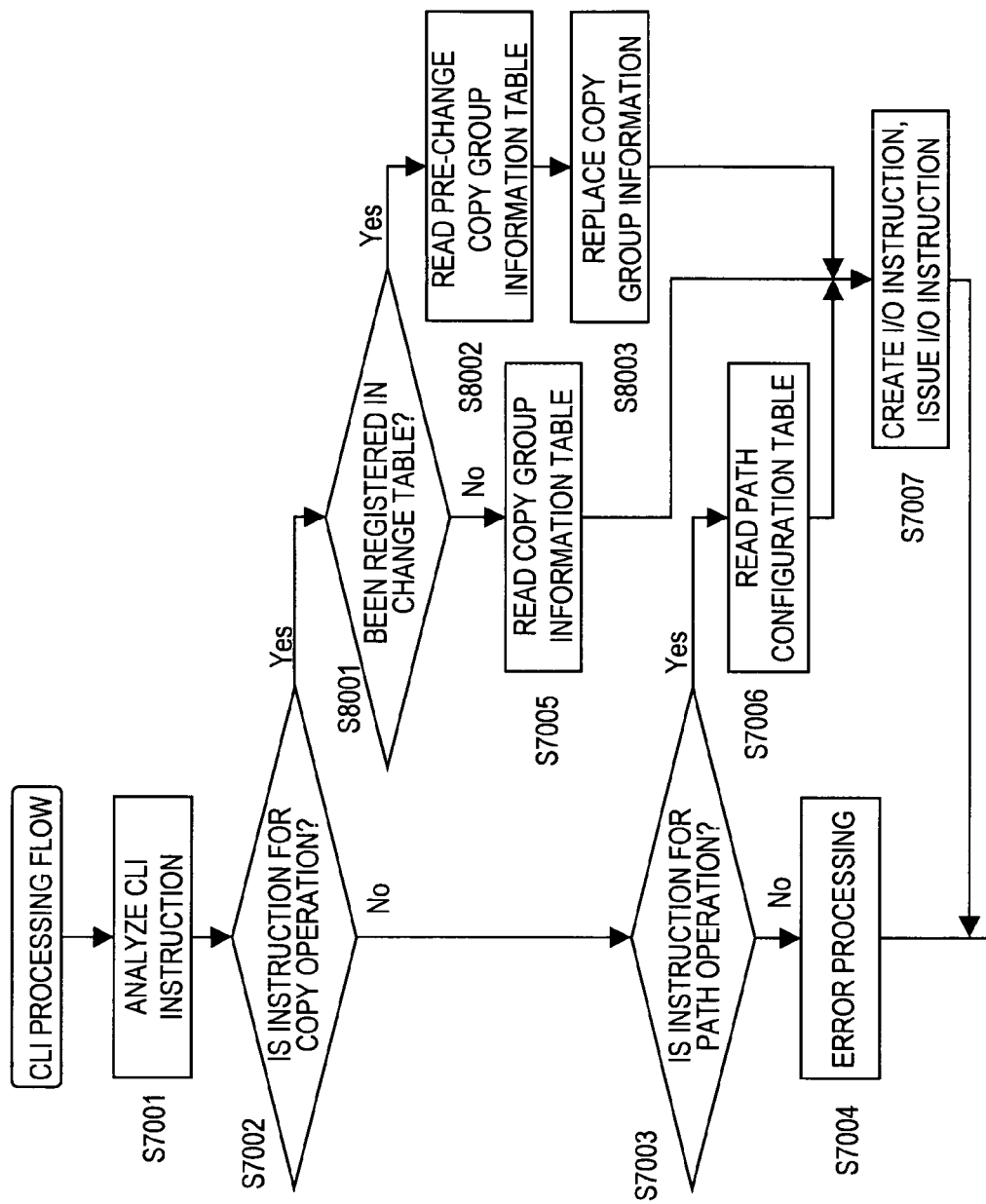
FIG. 29 is a flow chart of CLI processing according to the embodiment of this invention.

FIG. 29 is a flow chart of CLI processing performed by the storage control program 1201.

The flow chart of FIG. 29 is similar to the flow chart of FIG. 23 which illustrates CLI processing performed by the storage control program. The difference between FIGS. 29 and 23 is that FIG. 29 has additional processing of judging that a new logical path and a new copy group have replaced old ones. In FIG. 29, processing common to FIG. 23 is given the same step number and the explanation thereof will be omitted.

When it is judged that the CLI operation code 12012 indicates a copy operation, the storage control program 1202 first consults the change table 1250 to judge whether or not a copy group ID that is designated as the copy group ID 12013 by the received CLI instruction has been registered as the post-change table ID 12503 in the change table 1250 and whether the copy group ID 12013 and the copy group ID 12503 are coincided or not (a step S8001). When it is judged that the designated copy group ID has been registered in the change table 1250, the storage control program 1202 first specifies, from the pre-change table ID 12501 in the change table 1250, which copy group information table 1206 is of before the change. Then the storage control program 1202 reads this copy group information table 1206 to record its copy in the memory 230 (a step S8002). The storage control program 1202 next obtains, from the changed information (before change) of the change table, which item of the obtained copy group information table 1206 is to be changed. The item to be changed in copying of this copy group information table 1206 is replaced with the changed information (after change) (a step S8003). Then, from the copy of the copy group information table 1206 where some items have been replaced, the storage control program 1202 creates an I/O instruction and issues the I/O instruction to the local storage control unit 400 (a step S7007).

On the other hand, when it is judged that the designated copy group has not been registered in the change table 1250, the storage control program 1202 reads the copy group information table 1206 that is designated by the CLI instruction as in FIG. 23 described above (the step S7006), and creates an I/O instruction to issue the I/O instruction to the local storage control unit 400 (the step S7007).

In short, when the definition of a path is changed, the storage control program 1202 automatically changes settings of the copy group that is related to this path.

As has been described, the topology of the storage network system according to this embodiment is changed to the abnormal system topology in the case where a failure in the primary host computer 100 halts processing of the primary host computer 100 but the primary storage control unit 200 is operating normally. To switch from the normal system topology to the abnormal system topology, paths defined between the storage control units are changed, and copy group settings are changed in accordance with the path definition change. In this way, a service can be kept provided by switching over from the primary storage system to a storage system that is located near the primary storage system to receive data from the primary storage system through synchronous remote copy, instead of switching over to a storage system that is located far from the primary storage system to receive data from the primary storage system through asynchronous remote copy. A data loss from a failure confined within the primary host computer 100 is thus prevented.

A modification example of this embodiment will be described next.

Figure 30:
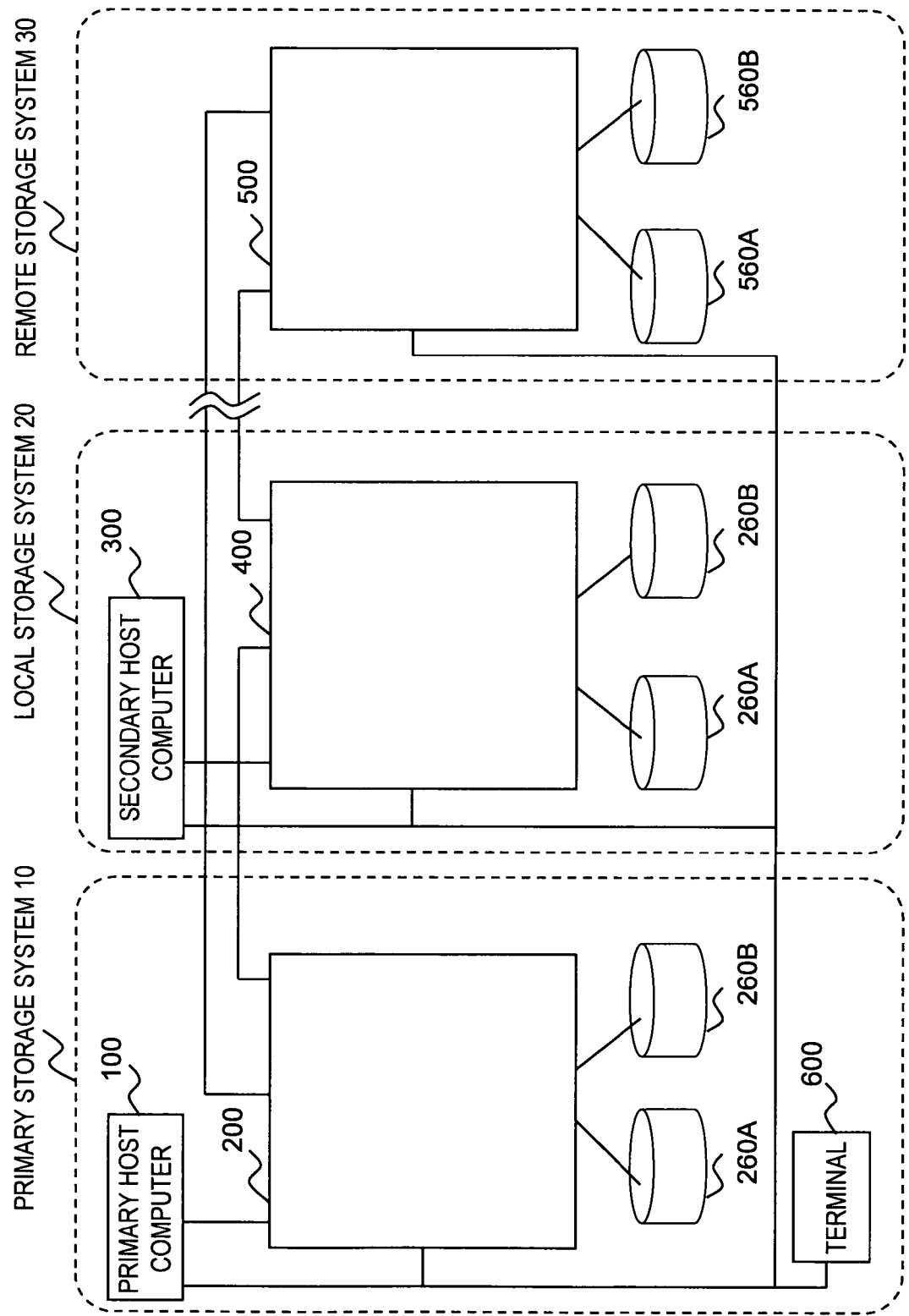
FIG. 30 is a block diagram showing a modification example of the storage network system according to the embodiment of this invention.

FIG. 30 is a block diagram showing a modification example of the storage network system according to this embodiment.

A terminal 600 is connected to the primary host computer 100, the primary storage control unit 200, the secondary host computer 300, the local storage control unit 400 and the remote storage control unit 500.

The terminal 600 receives an instruction from a user and sends the instruction to one of the hosts or storage control units to which it is connected. The terminal 600 also performs periodic monitoring for a failure in the primary host computer 100, the primary storage control unit 200, the secondary host computer 300, the local storage control unit 400 and the remote storage control unit 500.

The primary storage system 10, the local storage system 20 and the remote storage system 30 respectively have the same configurations as those described with reference to FIG. 1. However, the host adapters 410 of the local storage control unit 400 are configured differently from FIG. 1.

Figure 31:
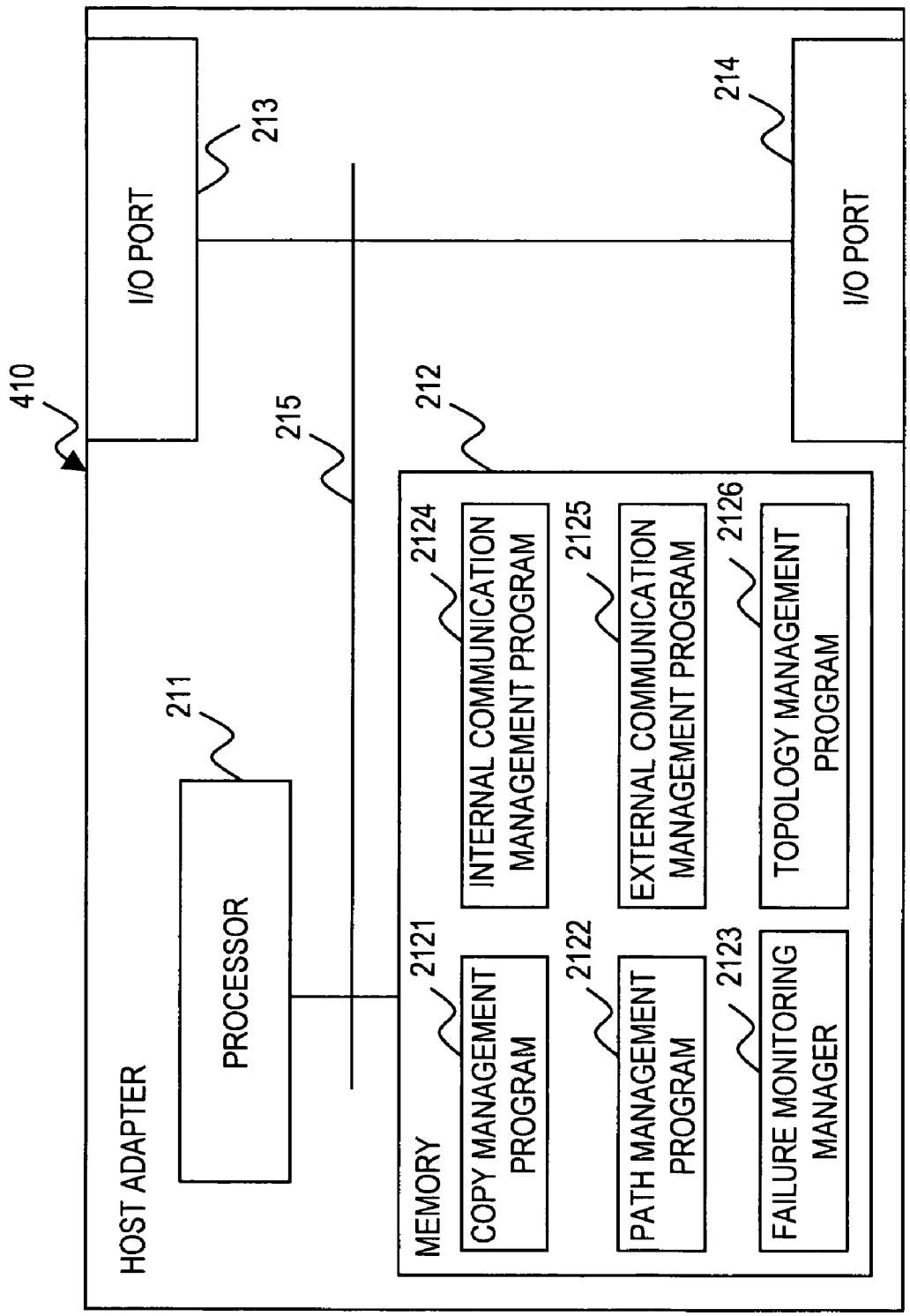
FIG. 31 is a block diagram showing a modification example of a host adapter 410 according to the embodiment of this invention.

FIG. 31 is a block diagram of each of the host adapters 410 in the local storage control unit 400.

The memory 212 of each of the host adapters 410 stores a topology control program 2126. This topology control program 2126 receives an instruction inputted by a user through the terminal 600.

Upon detecting a failure in the primary host computer 100, the terminal 600 notifies the user who is operating the terminal 600 of the failure. Notified of the failure, the user gives an instruction to the topology control program 2126. The instruction given here is the same as the one given in the above-described processing of FIG. 27. Through this processing, the storage network system is switched to the abnormal system topology of FIG. 26.

Thus, in a modification example of the embodiment, a switch to the abnormal system topology can be made by an instruction from the terminal 600 connected to the storage network system instead of an instruction from the primary host computer 100 or the secondary host computer 300.

While the present invention has been described in detail and pictorially in the accompanying drawings, the present invention is not limited to such detail but covers various obvious modifications and equivalent arrangements, which fall within the purview of the appended claims.

What is claimed is:

1. A management method for data transfer between storage systems in a computer system including:
   first, second and third storage systems which store data and are coupled to one another;
   a primary host computer coupled to the first storage system; and
   a secondary host computer coupled to the second storage system, the method carried out by the computer system and comprising:
   the computer system setting, when the primary host computer is in an active state, a data which is sent from the primary host computer and stored in the first storage system to be copied through a first copy route which is a synchronous copy from the first storage system to the second storage system, and a asynchronous copy from the second storage system to the third storage system, and
   the computer setting, when a failure occurs in the primary host computer, the secondary host computer to be in the active state and to change the first copy route to a second copy route which is a synchronous copy from the second storage system to the first storage system and a asynchronous copy from the first storage system to the third storage system, and to set a data which is sent from the secondary host computer and stored in the second storage system to be copied through the second copy route.

2. The management method according to claim 1, wherein the computer system comprises a terminal which detects a failure in the computers, and which is coupled to the first storage system, the second storage system, the third storage system, the primary host computer, and the secondary host computer by a line different from one that is used to transfer data to each storage system, wherein:
   the method comprising when the terminal detects a failure in the primary host computer and the secondary host computer starts operating, generating the second command to set the second copy route such that data stored in the second storage system is transferred to the first storage system whereas data stored in the first storage system is transferred to the third storage system, and sending the second command to one of the storage systems.

3. A computer system comprising:
   first, second and third storage systems which store data and are coupled to one another;
   a primary host computer coupled to the first storage system;
   a secondary host computer coupled to the second storage system; and
   wherein the computer system is adapted to set, when the primary host computer is in an active state, a data which is sent from the primary host computer and stored in the first storage system to be copied through a first copy route which is a synchronous copy from the first storage system to the second storage system, and a asynchronous copy from the second storage system to the third storage system, and wherein the computer is adapted to set, when a failure occurs in the primary host computer, the secondary host computer to be in the active state and to change the first copy route to a second copy route which is a synchronous copy from the second storage system to the first storage system and a asynchronous copy from the first storage system to the third storage system, and to set a data which is sent from the secondary host computer and stored in the second storage system to be copied through the second copy route.

4. The computer system according to claim 3, wherein the first copy route is set to the storage systems before the primary computer executes operation, and the second copy route is set to the storage systems before the second computer executes operation.

5. The computer system according to claim 3, wherein the first copy route and the second copy route are set by source storage areas, destination storage areas, and logical paths between the source storage areas and the destination storage areas.

* * * * *